(12) United States Patent
Ramos et al.

(10) Patent No.: US 12,367,010 B1
(45) Date of Patent: Jul. 22, 2025

(54) SYSTEMS AND METHODS FOR FACILITATING AUDIO PROCESSING

(71) Applicant: MOISES SYSTEMS, INC., Salt Lake City, UT (US)

(72) Inventors: Geraldo Ramos, Salt Lake City, UT (US); Hugo Rodrigues, Salt Lake City, UT (US)

(73) Assignee: MOISES SYSTEMS, INC., Salt Lake City, UT (US)

( * ) Notice: Subject to any disclaimer, the term of this patent is extended or adjusted under 35 U.S.C. 154(b) by 0 days.

(21) Appl. No.: 19/040,036

(22) Filed: Jan. 29, 2025

Related U.S. Application Data

(60) Provisional application No. 63/634,104, filed on Apr. 15, 2024.

(51) Int. Cl.
*G06F 3/0484* (2022.01)
*G06F 3/16* (2006.01)

(52) U.S. Cl.
CPC ............ *G06F 3/165* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 5,546,519 A | * | 8/1996 | Berry | G06F 8/34 715/835 |
| 6,633,888 B1 | * | 10/2003 | Kobayashi | G06F 8/34 707/999.102 |
| 2020/0285449 A1 | * | 9/2020 | McIntosh | G06V 10/82 |
| 2021/0158939 A1 | * | 5/2021 | Mathur | G06F 11/3476 |
| 2024/0126516 A1 | * | 4/2024 | Huang | G06F 3/0486 |

* cited by examiner

*Primary Examiner* — Tuan S Nguyen
(74) *Attorney, Agent, or Firm* — WORKMAN NYDEGGER

(57) ABSTRACT

A system is configurable to: (i) cause presentation of an audio processing workflow generation interface comprising: (a) a module tray comprising a plurality of audio processing modules and (b) a workflow canvas configured for placement and display of audio processing modules selected for inclusion in an audio processing workflow; (ii) receive user input selecting a set of audio processing modules from the plurality of audio processing modules of the module tray; (iii) receive user input directed to the workflow canvas in association with the set of audio processing modules; and (iv) place and display a set of representations of the set of audio processing modules on the workflow canvas, wherein each representation of the set of representations includes an input node and an output node and is associated with a respective audio processing module of the set of audio processing modules.

20 Claims, 22 Drawing Sheets

SYSTEMS AND METHODS FOR FACILITATING AUDIO PROCESSING

CROSS-REFERENCE TO RELATED APPLICATIONS

This application claims priority to U.S. Provisional Application No. 63/634,104, filed on Apr. 15, 2024, and entitled "SYSTEMS AND METHODS FOR FACILITATING AUDIO PROCESSING", the entirety of which is incorporated herein by reference for all purposes.

BACKGROUND

Audio processing involves manipulating, refining, transforming, and/or extracting information from audio signals. In the music industry, audio processing plays an important role in shaping and enhancing the quality of music. Audio processing is also performed in various other domains, such as film and television, broadcasting and radio, telecommunications, speech recognition and synthesis, gaming, and/or others.

The performance of audio processing to fulfill industry needs is associated with numerous challenges. For instance, determining or structuring audio processing tasks tailored to fulfilling industry needs typically requires specialized technical knowledge. Many enterprises lack resources to regularly engage full-time audio engineers or specialists to ascertain audio processing needs and/or manage fulfillment of such needs. Where needed audio processing tasks are known, the fulfillment of such tasks often involves developing code for performing audio processing tasks or sourcing services from audio processing service providers. Developing task-specific code can be time-consuming and/or cost prohibitive. Sourcing third-party audio processing services can also be time-consuming and complex, particularly where services from multiple third-party providers are involved for fulfilling a single audio processing need.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
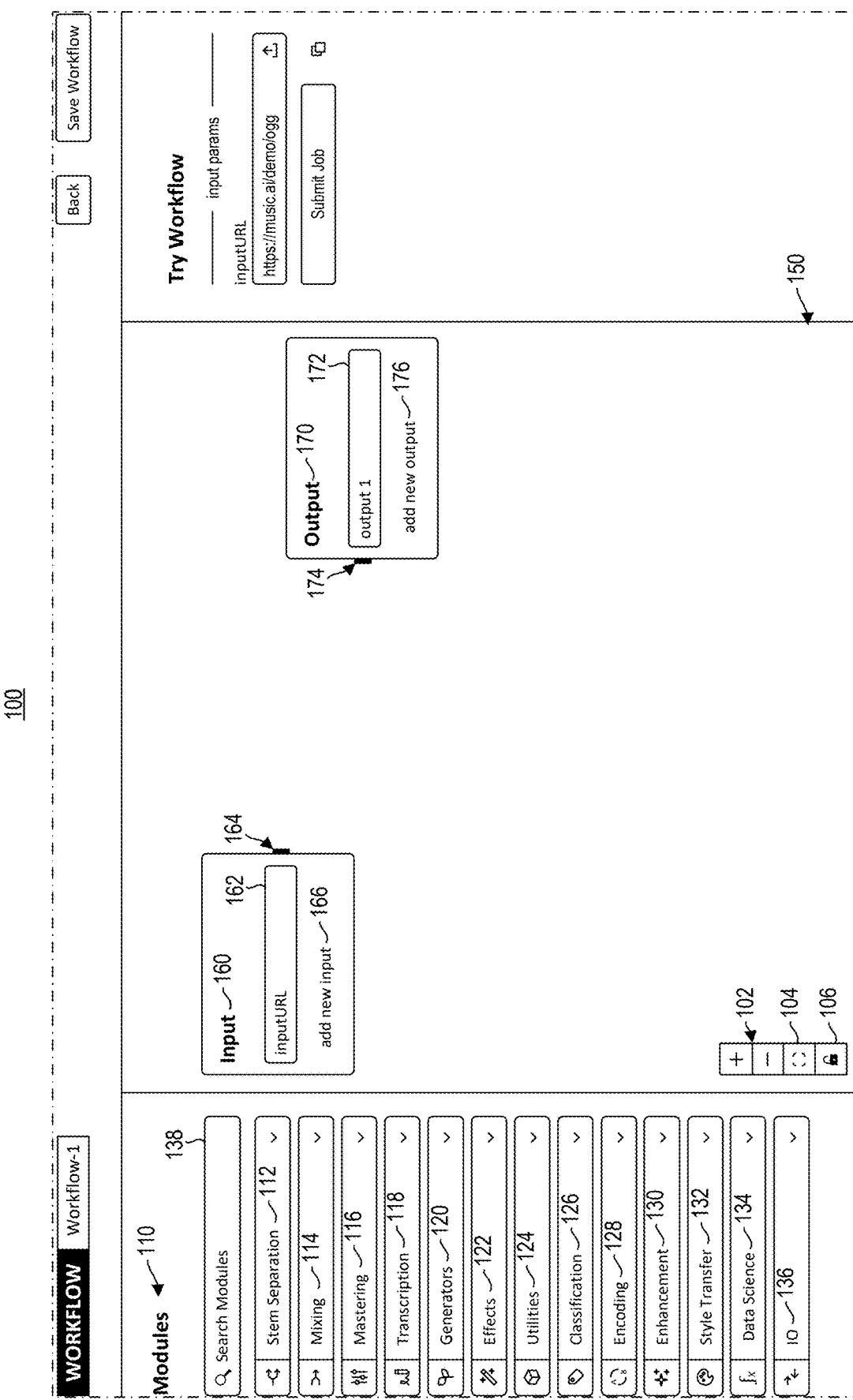
FIG. 1 illustrates a conceptual representation of an audio processing workflow generation interface including a module tray and a workflow canvas, in accordance with implementations of the disclosed subject matter.

Disclosed embodiments are directed to systems and methods for facilitating audio processing.

As noted above, audio processing is performed in various domains and involves manipulating, refining, transforming, and/or extracting information from audio signals. Fulfilling audio processing needs, such as by developing task-specific audio processing code or utilizing third-party audio processing services, can be expensive, time-consuming, and/or complicated to manage. Such challenges can operate as a barrier for many enterprises, which can stifle productivity and/or innovation.

At least some disclosed embodiments provide an audio processing workflow generation interface that can facilitate building of audio processing workflows. The audio processing workflow generation interface can be implemented as a web or browser interface/application, as a downloadable application interface, or in any other format. The audio processing workflow generation interface can include a module tray and a workflow canvas. The module tray can include representations of a variety of audio processing modules such as audio source separation modules, beat detection modules, audio transcription modules, and/or others.

The workflow canvas can include an input module for designating the input audio signal(s) to be processed. The workflow canvas can also include an output module for saving the results of workflows. The workflow canvas can provide a space whereon representations of audio processing modules from the module tray may be arranged in a desired order. For example, a user interacting with the audio processing workflow generation interface can drag and drop audio processing modules from the module tray onto the workflow canvas. The user can also draw or otherwise establish visual connections among the modules placed on the workflow canvas. For instance, a user may draw a connection from the input module to an input node of a first audio processing module and may draw another connection from the output node of the first audio processing module to an input node of a second audio processing module or to the output module. The input module, the various audio processing modules, the output module, and the visual connections among such modules as represented in the workflow canvas can define or form an audio processing workflow (or simply a "workflow").

After constructing a workflow using the workflow canvas and the module tray, the user can run the workflow to generate output audio, such as by selecting a "run workflow" selectable element on the audio processing workflow generation interface. If successful, the running of a workflow can cause generation of a link to the output audio (e.g., in the form of a file), which can be conveniently selected by the user to download or otherwise access the output audio. If unsuccessful, the audio processing workflow generation interface can notify the user, enabling the user to fix errors in the workflow (e.g., missing and/or improper connections among nodes of the workflow canvas, improper input file formats to various nodes, etc.). For instance, the workflow canvas can highlight or emphasize problematic modules for inspection by the user. The audio processing workflow generation interface can include selectable elements for saving of the workflow for future use.

A workflow generated and saved via an audio processing workflow generation interface as described herein can be accessed via other applications, tools, or interfaces. For example, a user may utilize a "jobs" user interface (e.g., on a web browser or application) and select a saved workflow from a list of saved workflows. The jobs user interface can then prompt the user to designate files, URLs, or other audio signal sources for processing via the saved workflow. The job can then be submitted, causing processing of the input audio signal sources via the saved workflow. The results or output audio can then be presented or provided to the user (e.g., in the form of downloadable files or links) for verification and/or use.

In some implementations, in addition to facilitating placement and/or ordering of audio processing modules and establishment of connections among modules, the representations of audio processing modules on the workflow canvas can enable selective modification of processing settings for the associated audio processing modules. For example, a representation of an audio mixer module on the workflow canvas can include modifiable volume settings for different audio channels. A user may provide user input directed toward the modifiable volume settings on the representation of the workflow canvas to define the volume settings that will be applied to the input audio signal when processed by the audio mixer module (e.g., when running the workflow).

Implementation of the disclosed techniques can enable users to rapidly generate audio processing workflows in a codeless manner, which can drastically reduce the technical expertise required to generate such workflows. The disclosed principles can enable users to access numerous types of audio processing modules in a single interface, which can eliminate the need to source audio processing services from multiple third-party providers. Such functionality can enhance audio processing capabilities of numerous enterprises, which can promote productivity and/or innovation.

Having just described some of the various high-level features and benefits of the disclosed embodiments, attention will now be directed to the Figures, which illustrate various conceptual representations, architectures, methods, and/or supporting illustrations related to the disclosed embodiments.

FIG. 1 illustrates a conceptual representation of an audio processing workflow generation interface 100. The audio processing workflow generation interface 100 can be presented on a user interface device to facilitate user interaction with the audio processing workflow generation interface 100. The user interface device may comprise a user computing system implemented as a system 2200 and/or components thereof, as described hereinafter with reference to FIG. 22. In some implementations, the audio processing workflow generation interface 100 may be accessible as a web application via a web browser or web interface interacting with a server (e.g., remote system(s) 2212, as described hereinafter with reference to FIG. 22). In some instances, the audio processing workflow generation interface 100 may be accessible as a downloadable application that is executable on a user device and that interacts with a server.

As shown in the example of FIG. 1, the audio processing workflow generation interface 100 includes a module tray 110 and a workflow canvas 150. The module tray 110 includes various categories of audio processing modules, such as stem separation modules 112, mixing modules 114, mastering modules 116, transcription modules 118, generator modules 120, effects modules 122, utilities modules 124, classification modules 126, encoding modules 128, enhancement modules 130, style transfer modules 132, data science modules 134, and input/output modules 136. Each of the categories of audio processing modules of the module tray 110 can include sets of modules that are executable to modify, transform, manipulate, refine, extract information from, and/or otherwise process input audio signals. Additional details related to the specific example modules of the module tray 110 will be discussed hereinafter.

In the example of FIG. 1, the module tray 110 includes a module search field 138, which can facilitate searching among the audio processing modules of the module tray 110. For instance, the module search field 138 of FIG. 1 is implemented as a text input field, which enables user to input query text to search for audio processing modules that correspond to the query text. The module search field 138 can enable users to readily and/or rapidly access desired audio processing modules from the module tray 110.

The workflow canvas 150 enables placement and display of audio processing modules (e.g., from the module tray 110) to facilitate creation of audio processing workflows. In the example of FIG. 1, the audio processing workflow generation interface 100 includes an input module 160 and an output module 170. In some instances, the input module 160 and the output module 170 are automatically instantiated in the workflow canvas 150 upon creation of a new audio processing workflow in the audio processing workflow generation interface 100. In some instances, the input module 160 and the output module 170 are placed within the workflow canvas 150 via user input (e.g., interacting with the input/output modules 136 element of the module tray 110). Although a single input module 160 and output module 170 are shown in the example of FIG. 1, any quantity of input modules 160 and output modules 170 may be utilized in an audio processing workflow defined in a workflow canvas 150.

The input module 160 can designate the source or input audio signal or file to be processed via an audio processing workflow defined in the workflow canvas 150. In the example of FIG. 1, the input module 160 includes a uniform resource locator (URL) field 162 for defining a workflow input. For instance, a user may populate the URL field 162 with the web address of a source or input audio file to be processed via a workflow defined in the workflow canvas 150. Although a URL field 162 is utilized in the example of FIG. 1, other input audio signal definition methods are within the scope of the present disclosure (e.g., file upload methods, uniform resource identifier methods, handle systems, and/or others).

FIG. 1 illustrates the input module 160 as including an input module node 164. The input module node 164 can be associated with the audio signal input designated by the URL field 162. As will be described in more detail hereinafter, the input module node 164 may be used to define or display connections between the input module 160 and one or more audio processing modules placed within the workflow canvas 150. The connections may define the flow of data through an audio processing workflow represented in the workflow canvas 150.

In the example of FIG. 1, the input module 160 includes an add input element 166, which may be selectable to trigger addition of an additional URL field for defining an additional workflow input. In this regard, an audio processing workflow defined via a workflow canvas 150 can process multiple audio signal inputs. Selection of the add input element 166 can additionally trigger generation of an additional input module node associated with the additional workflow input, which can be used to connect the additional workflow input to one or more audio processing modules placed on the workflow canvas 150.

The output module 170 can facilitate access to and/or provision of the output audio signal or output information resulting from operation of an audio processing workflow defined in the workflow canvas 150. In the example of FIG. 1, the output module 170 includes an output name field 172 for defining the name of workflow output. The output module 170 of FIG. 1 also includes an output module node 174, which can be associated with the output name field 172. As will be described in more detail hereinafter, the output module node 174 can be used to define or display connections between one or more processing modules placed within the workflow canvas 150 and the output module 170. The connections may define which outputs of individual audio processing modules placed within the workflow canvas 150 form the overall output of the audio processing workflow defined within the workflow canvas 150.

Similar to the input module 160 discussed above, the output module 170 of FIG. 1 includes an add output element 176, which may be selectable to trigger addition of an additional output name field (and an additional output module node associated with the additional output name field). In this regard, an audio processing workflow defined via a workflow canvas 150 can generate multiple audio processing outputs (e.g., separate output files).

The audio processing workflow generation interface 100 shown in FIG. 1 also includes various other selectable elements for interacting with the workflow canvas 150. For instance, the audio processing workflow generation interface 100 of FIG. 1 includes view modification elements, such as zoom in/out tools 102 and a fit view tool 104, which can enable users to change their view of audio processing modules represented on the workflow canvas 150. The workflow canvas 150 can also enable view panning to enable users to view different regions of an audio processing workflow defined in the workflow canvas 150. The audio processing workflow generation interface 100 of FIG. 1 also includes an interactivity lock element 106, which can trigger locking of modifiability of an audio processing workflow (e.g., module placement, connections among module nodes) defined in the workflow canvas 150.

Figure 2:
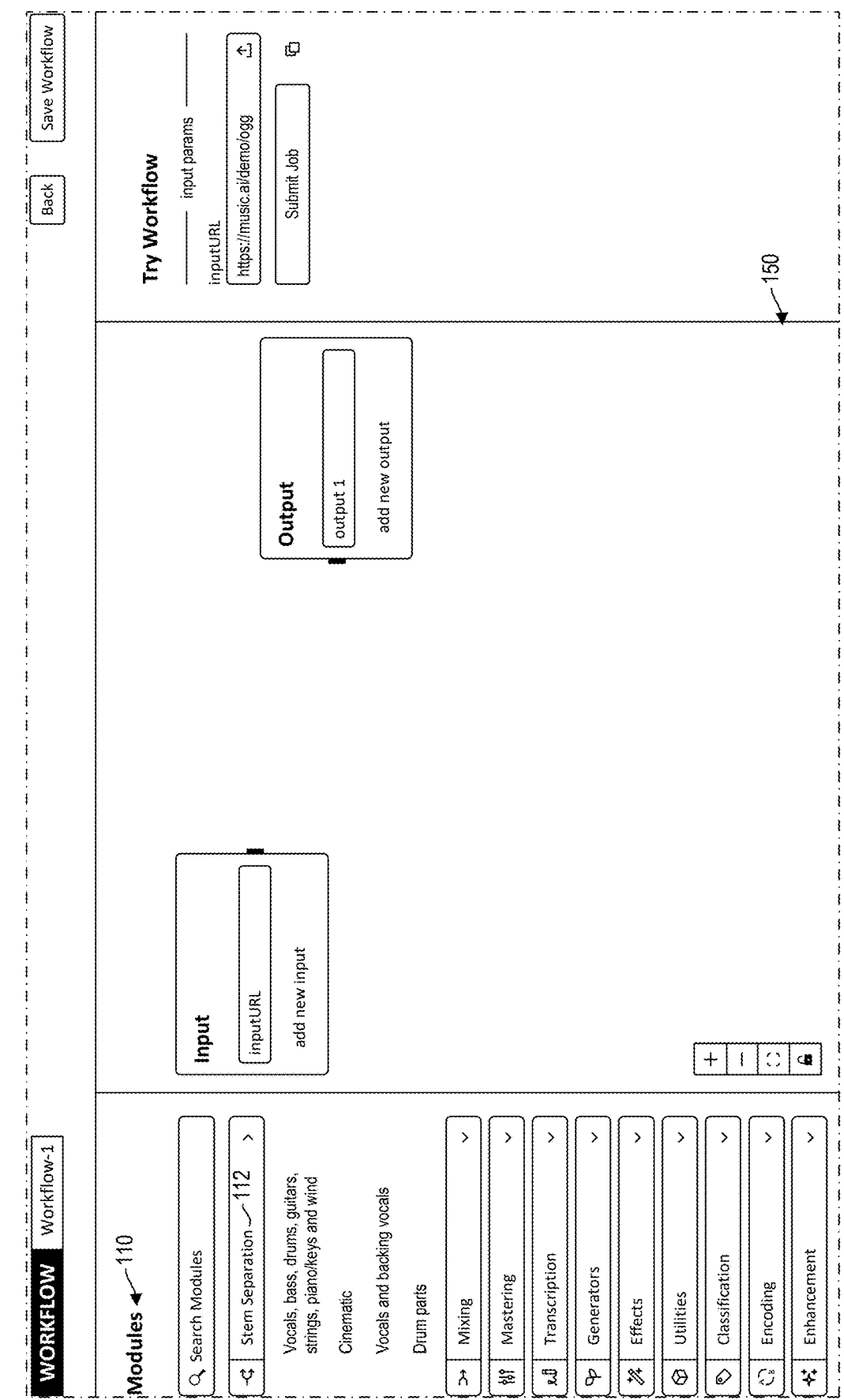
FIGS. 2, 3, and 4 illustrate conceptual representations of interacting with the module tray of the audio processing workflow generation interface, in accordance with implementations of the disclosed subject matter.
Figure 3:
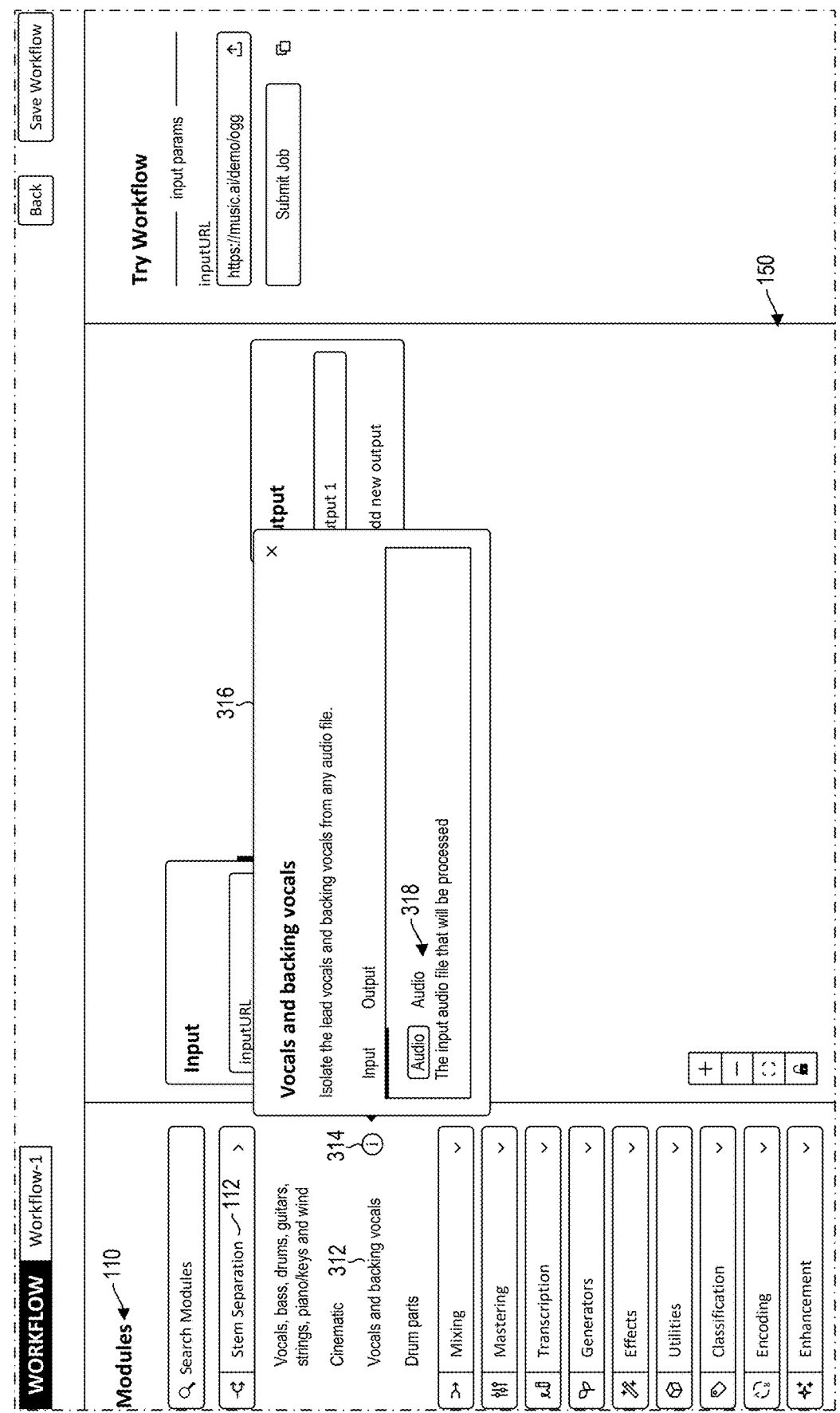
Figure 4:
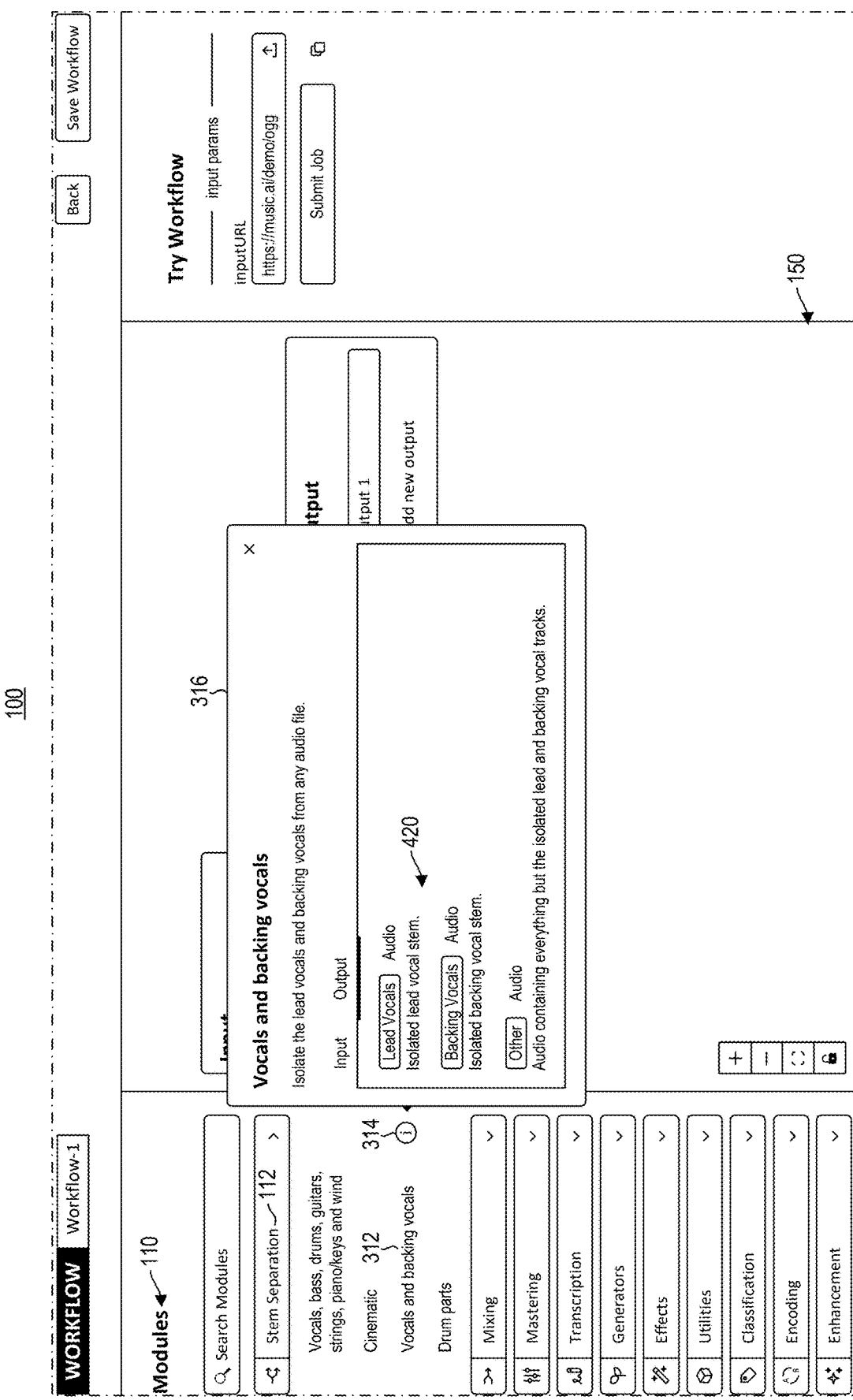

FIGS. 2, 3, and 4 illustrate conceptual representations of interacting with the module tray 110 of the audio processing workflow generation interface 100. As noted above, each of the different module categories of the module tray 110 can include one or more audio processing modules. FIG. 2 illustrates the stem separation modules 112 expanded (e.g., in response to user input selecting the stem separation modules 112 within the module tray 110) to show the individual stem separation modules provided in the module tray 110. FIG. 3 illustrates an example in which the vocals and backing vocals module 312 is selected within the module tray 110. The vocals and backing vocals module 312 may be selected by user input directed thereto (e.g., mouse click input, touch input, gesture input, voice input, keyboard/hotkey/shortcut input, etc.). FIG. 3 depicts selection of the vocals and backing vocals module 312 by showing the text associated with the module in bolded form.

In some implementations, as shown in FIG. 3, the module tray 110 can provide information related to the various audio processing modules thereof. For instance, FIG. 3 illustrates an information icon 314 associated with the vocals and backing vocals module 312, the selection of which triggers display of an information window 316 for the vocals and backing vocals module 312. The information window 316 can indicate the functionality of the associated audio processing module. In the example of FIG. 3, the information window 316 describes that the vocals and backing vocals module 312 is configured to "Isolate the lead vocals and backing vocals from any audio file."

The information window 316 can additionally or alternatively describe information related to the inputs and outputs associated with the vocals and backing vocals module 312. For instance, FIG. 3 shows an input description 318 of the information window 316, which describes that the vocals and backing vocals module 312 is configured to receive an audio signal as input (e.g., "The input audio file that will be processed."). FIG. 4 shows an output description 420 of the information window 316, which describes that the vocals and backing vocals module 312 includes multiple output channels, including lead vocals output audio (e.g., "Isolated Lead vocal stem."), backing vocals output audio (e.g., "Isolated backing vocal stem."), and other output audio (e.g., "Audio containing everything but the isolated lead and backing vocal tracks.").

Figure 5:
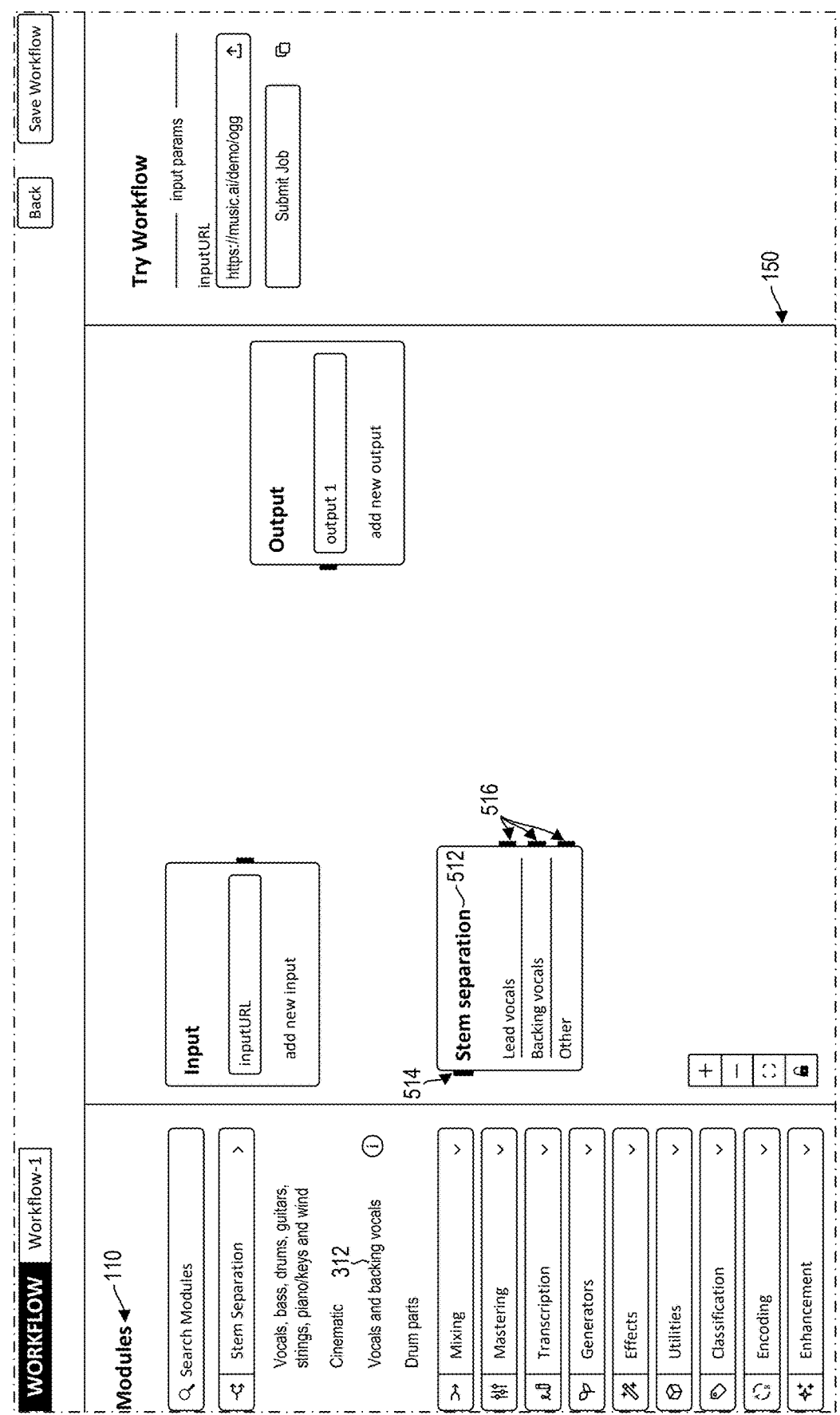
FIGS. 5 and 6 illustrate conceptual representations of placing and displaying representations of audio processing modules from the module tray on the workflow canvas, in accordance with implementations of the disclosed subject matter.

FIG. 5 illustrates a conceptual representation of placing and displaying a representation 512 of the vocals and backing vocals module 312 from the module tray 110 on the workflow canvas 150 of the audio processing workflow generation interface 100. Similar to FIG. 3, FIG. 5 depicts selection of the vocals and backing vocals module 312 (e.g., showing the backing vocals module 312 in bolded form), which can be accomplished in some instances by user input directed to the vocals and backing vocals module 312 within the module tray 110. As noted above, user input selecting the vocals and backing vocals module 312 (or any audio processing module of the module tray 110) can take on various forms.

The representation 512 of the vocals and backing vocals module 312 noted above may be generated, placed, and/or displayed on the workflow canvas 150 in response to user input directed to the workflow canvas 150. Such user input can be associated with the selected vocals and backing vocals module 312 in various ways. For instance, the user input directed to the workflow canvas 150 that causes generation and presentation of the representation 512 can be provided while the vocals and backing vocals module 312 is in a "selected" state within the module tray 110 (e.g., based on initial user input selecting the vocals and backing vocals module 312 within the module tray 110). As another example, the user input that selects the vocals and backing vocals module 312 within the module tray 110 and the user input that is directed to the workflow canvas 150 to cause placement and display of the representation 512 can comprise dragging input (e.g., click and drag or touch and drag input) that drags the vocals and backing vocals module 312 from the module tray 110 onto the workflow canvas 150. The location of representation 512 on the workflow canvas 150 can be based on the location of the user input directed to the workflow canvas 150 that triggers generation/presentation of the representation 512 within the workflow canvas 150.

As shown in FIG. 5, the representation 512 (associated with the vocals and backing vocals module 312) on the workflow canvas 150 includes an input node 514 and output nodes 516. Although the representation 512 of FIG. 5 includes a single input node 514 and multiple output nodes 516, a representation of an audio processing module on the workflow canvas 150 can include any quantity of input and output nodes. In the example of FIG. 5, the input node 514 is associated with the input audio for the vocals and backing vocals module 312 discussed hereinabove with reference to FIG. 3, and the output nodes 516 are associated with the various output channels or types of output audio that the vocals and backing vocals module 312 can provide, as discussed hereinabove with reference to FIG. 4. For instance, FIG. 5 shows one output node 516 for lead vocals, one output node 516 for backing vocals, and one output node 516 for other audio.

Figure 6:
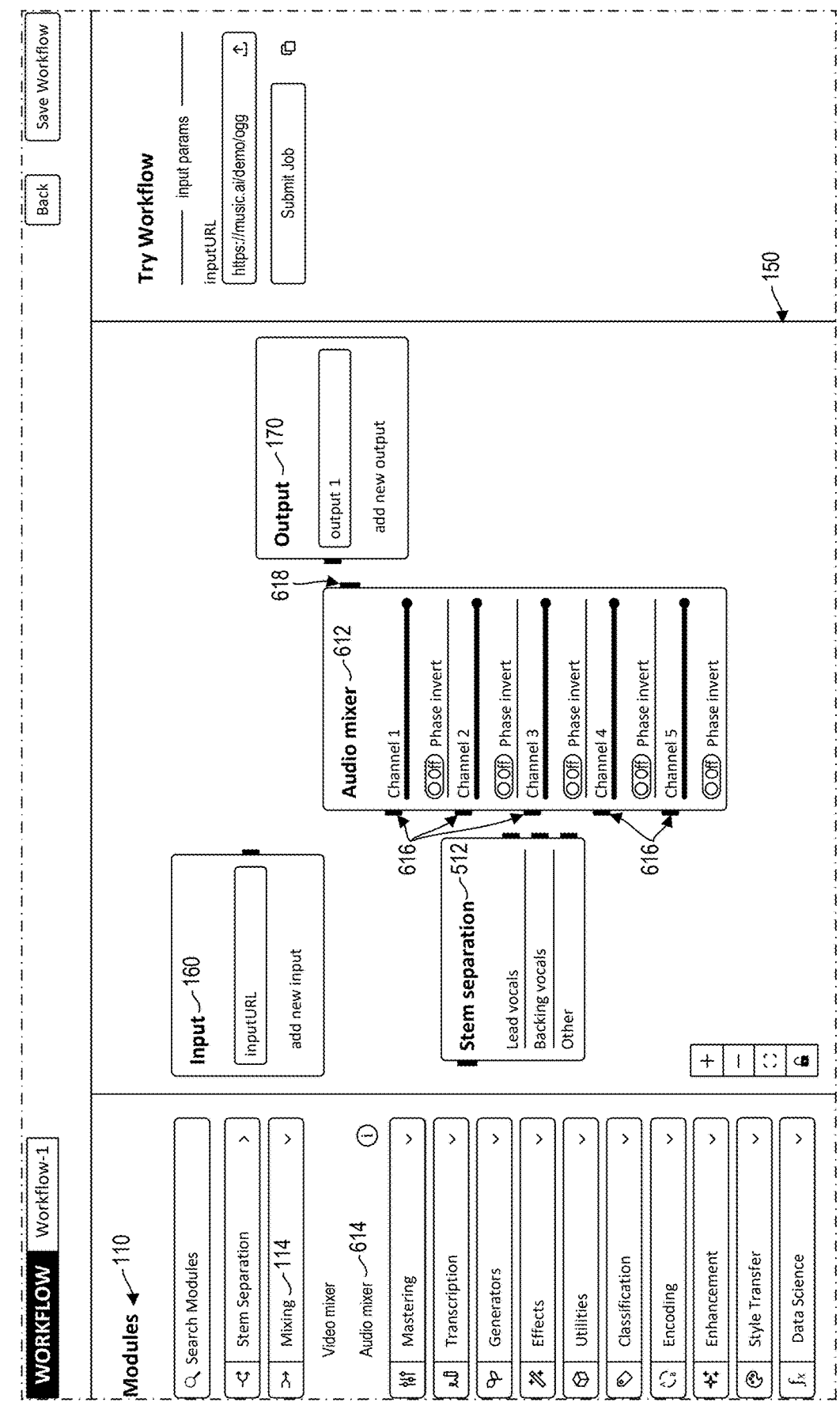

FIG. 6 depicts placement and display of a second or additional representation 612 of an audio processing module on the workflow canvas 150. The representation 612 of FIG. 6 is associated with an audio mixer module 614, which is one of the mixing modules 114 of the module tray 110. The representation 612 can be placed and displayed on the workflow canvas 150 in a manner similar to that described above for causing placement and display of the representation 512 on the workflow canvas 150 (e.g., a user may provide input dragging the audio mixer module 614 from the module tray 110 onto the workflow canvas 150).

In the example of FIG. 6, the representation 612 (associated with the audio mixer module 614) on the workflow canvas 150 includes multiple input nodes 616 and an output node 618. The input nodes 616 can be associated with different input audio signal channels, and the output node 618 can be associated with a combined output audio signal that comprises all mixed input channels.

In the example of FIG. 6, the workflow canvas 150 includes an input module 160, an output module 170, and representations 512 and 612 of different audio processing modules (e.g. vocals and backing vocals module 312, audio mixer module 614). Other selections, quantities, and/or configurations of input modules, output modules, and/or audio processing modules may be placed on a workflow canvas 150 in accordance with implementations of the disclosed subject matter.

Representations of audio processing modules placed and displayed on the workflow canvas 150 can facilitate definition of an audio processing workflow, whereby input defined at the input module 160 can be processed by the audio processing modules represented on the workflow canvas 150 to provide output designated at the output module 170. The data flow for the audio processing workflow (e.g., the movement or transfer of information through the various audio processing modules) can be defined using the input and output nodes of the representations of audio processing modules placed within the workflow canvas 150. For instance, the data flow for the audio processing workflow may be defined by visual connections among the modules of the workflow canvas 150, which may be established via user input directed to the workflow canvas 150.

Figure 7:
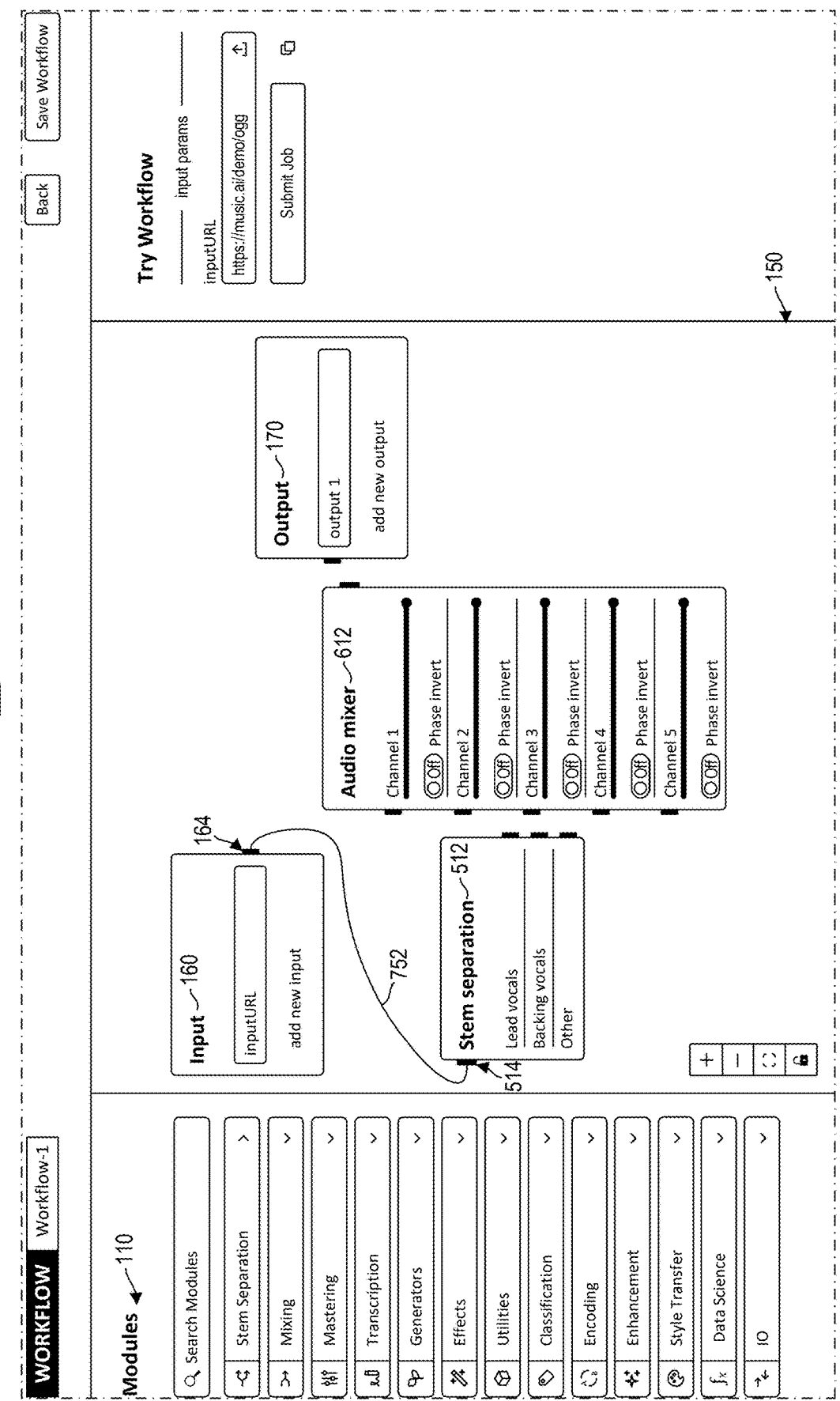
FIGS. 7 and 8 illustrate conceptual representations of generating visual connections among modules represented in the workflow canvas, in accordance with implementations of the disclosed subject matter.

FIG. 7 illustrates a conceptual representation of generating a visual connection among modules represented in the workflow canvas 150. In particular, FIG. 7 shows a visual connection 752 that connects the input module node 164 of the input module 160 to the input node 514 of the representation 512 (associated with the vocals and backing vocals module 312). The visual connection 752 can be generated and displayed in response to user input, such as user input directed to the input module node 164 and to the input node 514. The user input directed to the input module node 164 and the input node 514 can take on various forms, such as sequential user input directed to the input module node 164 and the input node 514 (in any order), dragging input (e.g., dragging one of the nodes to the other), and/or others. As used herein, user input directed to the input module node 164 and to the input node 514 (or any two nodes) can comprise user input directed to the input module 160 and/or the representation 512 (or any two modules/representations) more generally.

The visual connection 752 between the input module node 164 and the input node 514 can define data flow for the workflow represented in the workflow canvas 150. For instance, the visual connection 752 can indicate that, pursuant to running of the workflow represented in the workflow canvas 150, the audio signal from the source designated by the input module 160 can be initially provided as input to the vocals and backing vocals module 312 and processed thereby.

Figure 8:
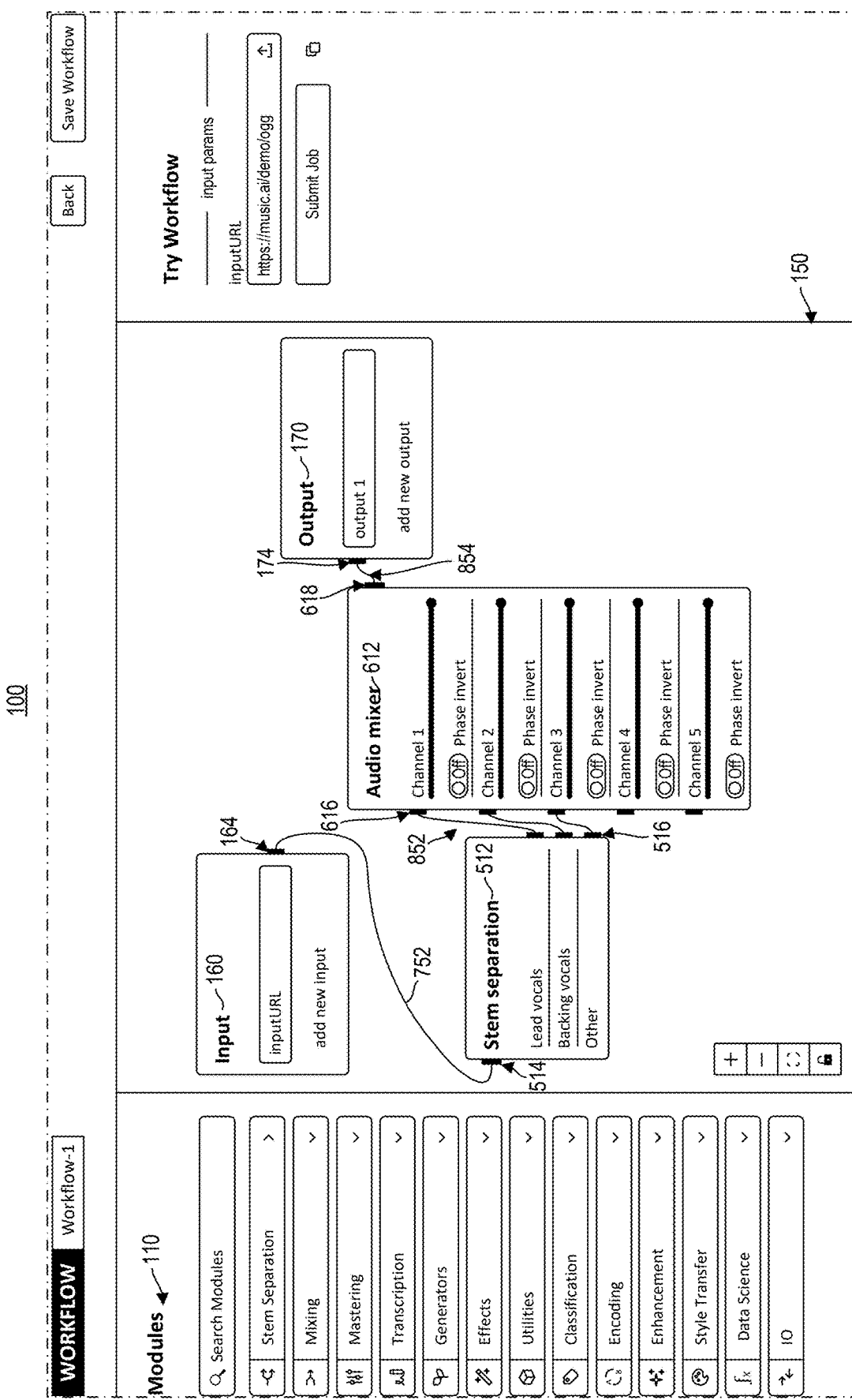

FIG. 8 illustrates additional visual connections established among the modules represented in the workflow canvas 150 to define the data flow for the audio processing workflow represented in the workflow canvas 150. In particular, FIG. 8 illustrates visual connections 852 connecting the output nodes 516 of the representation 512 to input nodes 616 of the representation 612. FIG. 8 also illustrates a visual connection 854 connecting the output node 618 of the representation 612 to the output module node 174 of the output module 170. The visual connections 852 and 854 may be generated in a manner similar to that described hereinabove for generating the visual connection 752 between the input module node 164 and the input node 514. For instance, the visual connections 852 may be generated via user input directed to the output nodes 516 and to the input nodes 616, and the visual connection 854 may be generated via user input directed to the output node 618 and the output module node 174.

The visual connections 852 and 854 may similarly contribute to defining the data flow for the audio processing workflow represented in the workflow canvas 150 (which audio processing workflow can comprise the modules represented in the workflow canvas 150 interconnected according to the visual connections of the workflow canvas 150). For instance, the visual connections 852 can indicate that, pursuant to running of the workflow represented in the workflow canvas 150, the lead vocals output, the backing vocals output, and the other audio output of the vocals and backing vocals module 312 (represented by the output nodes 516 of the representation 512) can be provided as input to respective input audio signal channels of the audio mixer module 614 (represented by the input nodes 616 of the representation 612), which may each be processed by the audio mixer module 614 and combined to form the combined output audio signal of the audio mixer module 614 (represented by the output node 618 of the representation 612). Visual connection 854 can indicate that, pursuant to running of the audio processing workflow represented in the workflow canvas 150, the combined output audio signal of the audio mixer module 614 (represented by the output node 618 of the representation 612) can be provided to the output module 170 to form the output of the audio processing workflow.

Figure 9:
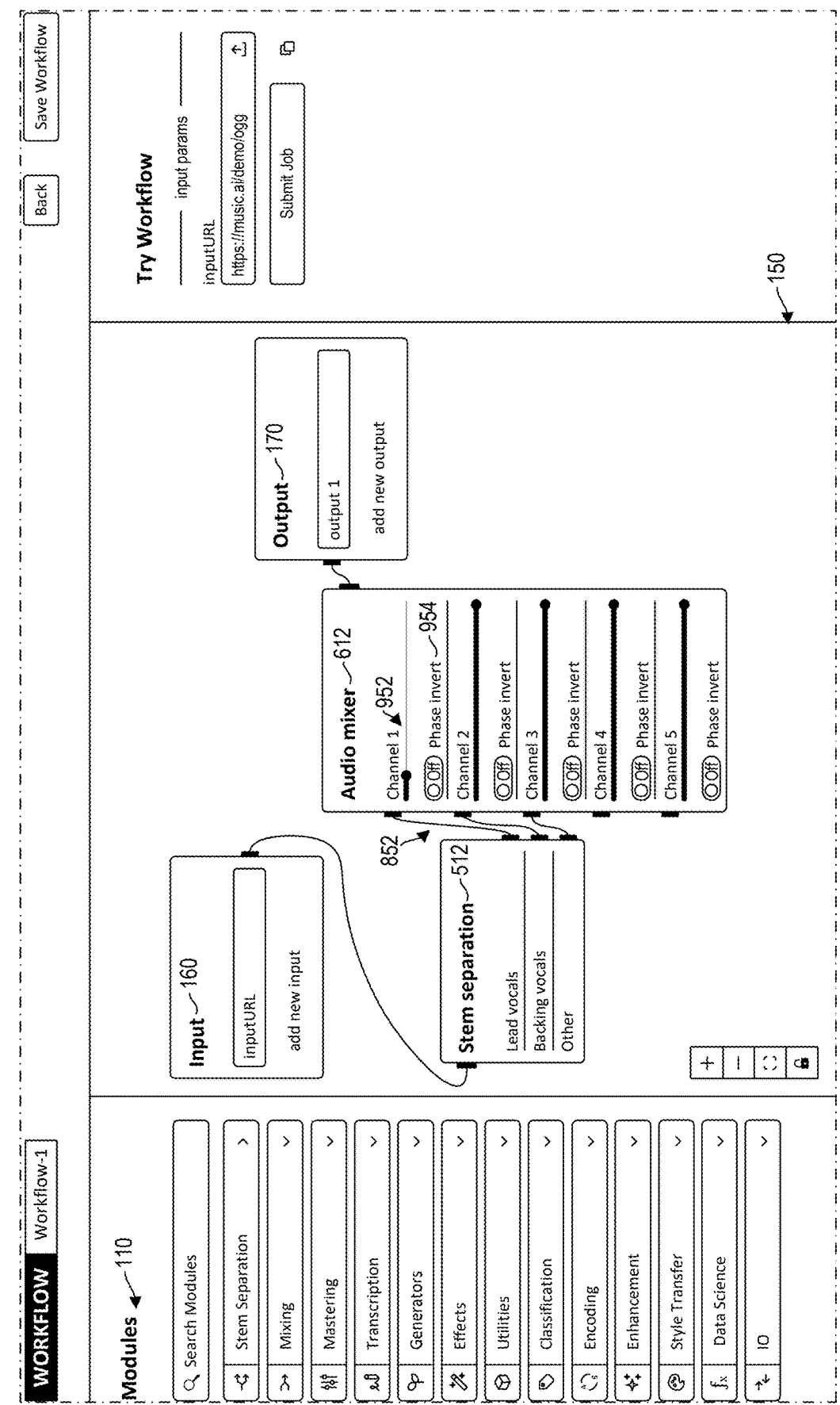
FIG. 9 illustrates a conceptual representation of modifying processing settings of a representation of an audio processing module on the workflow canvas, in accordance with implementations of the disclosed subject matter.

In some implementations, representations of audio processing modules shown in the workflow canvas 150 can comprise processing settings (or parameters, constraints, configurations, etc.) for the corresponding audio processing modules. The processing settings can be selectively modifiable by users via user input directed to the workflow canvas 150, which can enable users to easily adjust processing settings for the audio processing workflow represented in the workflow canvas 150. For example, FIG. 9 illustrates volume settings 952 and phase inversion settings 954 for the various input audio signal channels of the audio mixer module 614 associated with the representation 612 in the workflow canvas 150. The volume settings 952 and the phase inversion settings 954 can be individually modified or adjusted via user input directed to the workflow canvas 150 for the different input audio signal channels of the audio mixer module 614. FIG. 9 illustrates an example in which the volume setting 952 for the first input audio signal channel ("Channel 1") of the audio mixer module 614 has been adjusted to 10% of the original input volume. Such a configuration can cause a corresponding volume reduction for the Channel 1 input audio signal (e.g., the lead vocals from the vocals and backing vocals module 312, according to the visual connections 852) when running the audio processing workflow defined via the workflow canvas 150. Other processing settings that may be included in representations of audio processing modules in the workflow canvas 150 will be described in more detail hereinafter.

Figure 10:
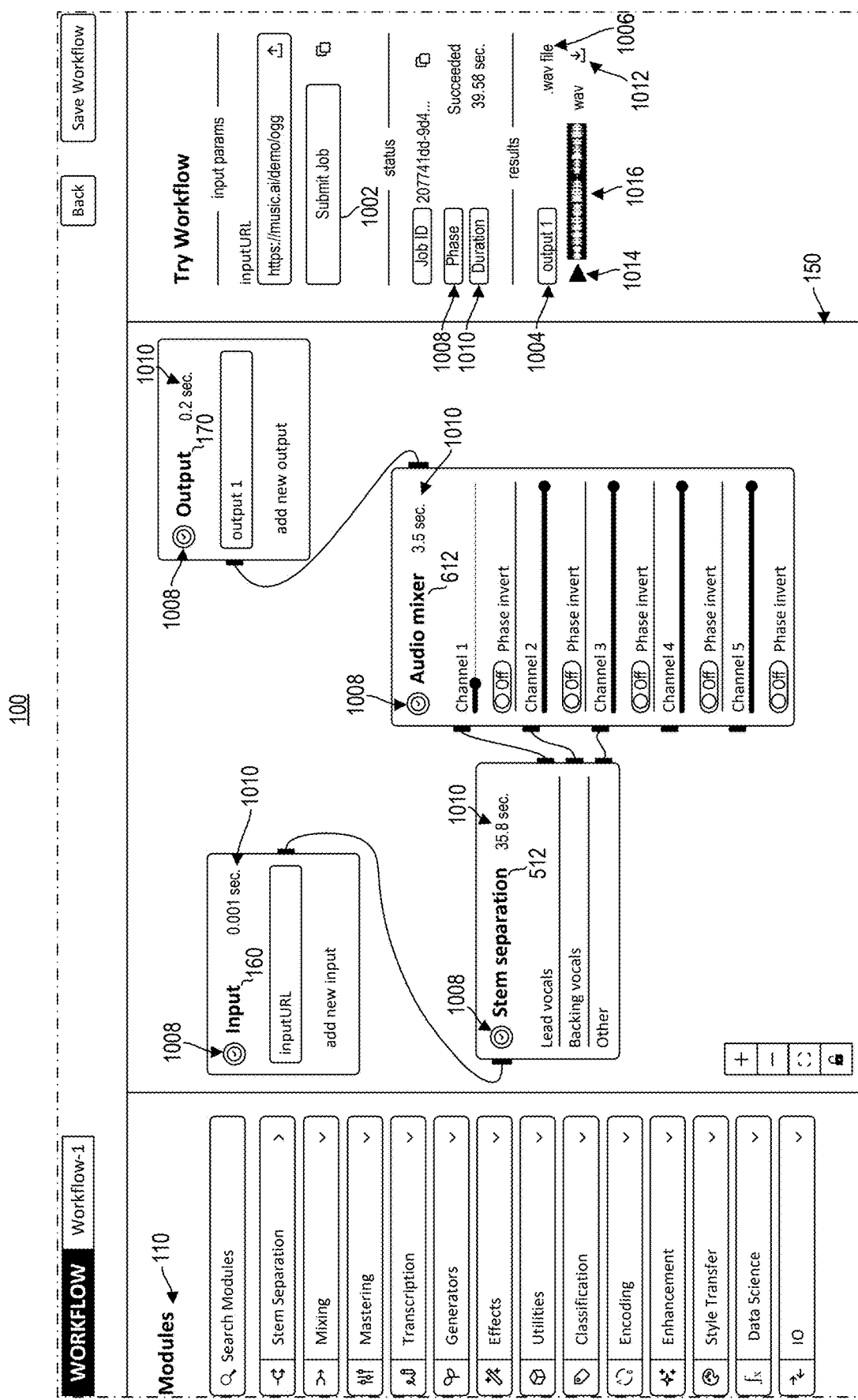
FIGS. 10 and 11 illustrate conceptual representations of running a workflow using the modules and connections shown in the workflow canvas, in accordance with implementations of the disclosed subject matter.

The representations of audio processing modules, the visual connections among modules, and the processing settings displayed on the workflow canvas 150 can define an audio processing workflow that can be used to process an input audio signal (defined via the input module 160) to provide an output (via the output module 170). FIG. 10 illustrates an example in which the audio processing workflow generation interface 100 includes a run workflow element 1002 (labeled "Submit job" in FIG. 10), the selection of which can trigger generation of an output by running the audio processing workflow represented in the workflow canvas 150. As noted above, the audio processing workflow represented in the workflow canvas 150 can utilize the audio processing modules associated with the representations shown on the workflow canvas 150 to process the input audio signal designated by the input module 160 in accordance with the visual connections and audio settings displayed in the workflow canvas 150 to provide an output according to the output module 170.

In the example of FIG. 10, the run workflow element 1002 has been selected, triggering generation of an output 1004. In some implementations, as shown in FIG. 10, the generation of the output 1004 includes generation and presentation of a link 1006 in the audio processing workflow generation interface 100 that provides access to the output (e.g., in the form of a downloadable file, URL, etc.). In some instances, the audio processing workflow generation interface 100 displays a success indicator 1008 and/or processing durations 1010 for the audio processing workflow and/or the various modules thereof that are represented in the workflow canvas 150 for generating the output 1004 in response to selection of the run workflow element 1002, as illustrated in FIG. 10. In some implementations, as shown in FIG. 10, the audio processing workflow generation interface 100 can present a playback feature 1012 associated with the output 1004, which can include a play/pause element 1014 and/or a navigation element 1016 (e.g., depicted as a waveform or navigation bar at which user input may be directed to navigate or scrub to different timepoints of the output 1004) for enabling the user to listen to the output 1004 via the audio processing workflow generation interface 100. In some instances, where multiple outputs are generated, multiple playback features can be depicted, enabling playback of the multiple different outputs.

Figure 11:
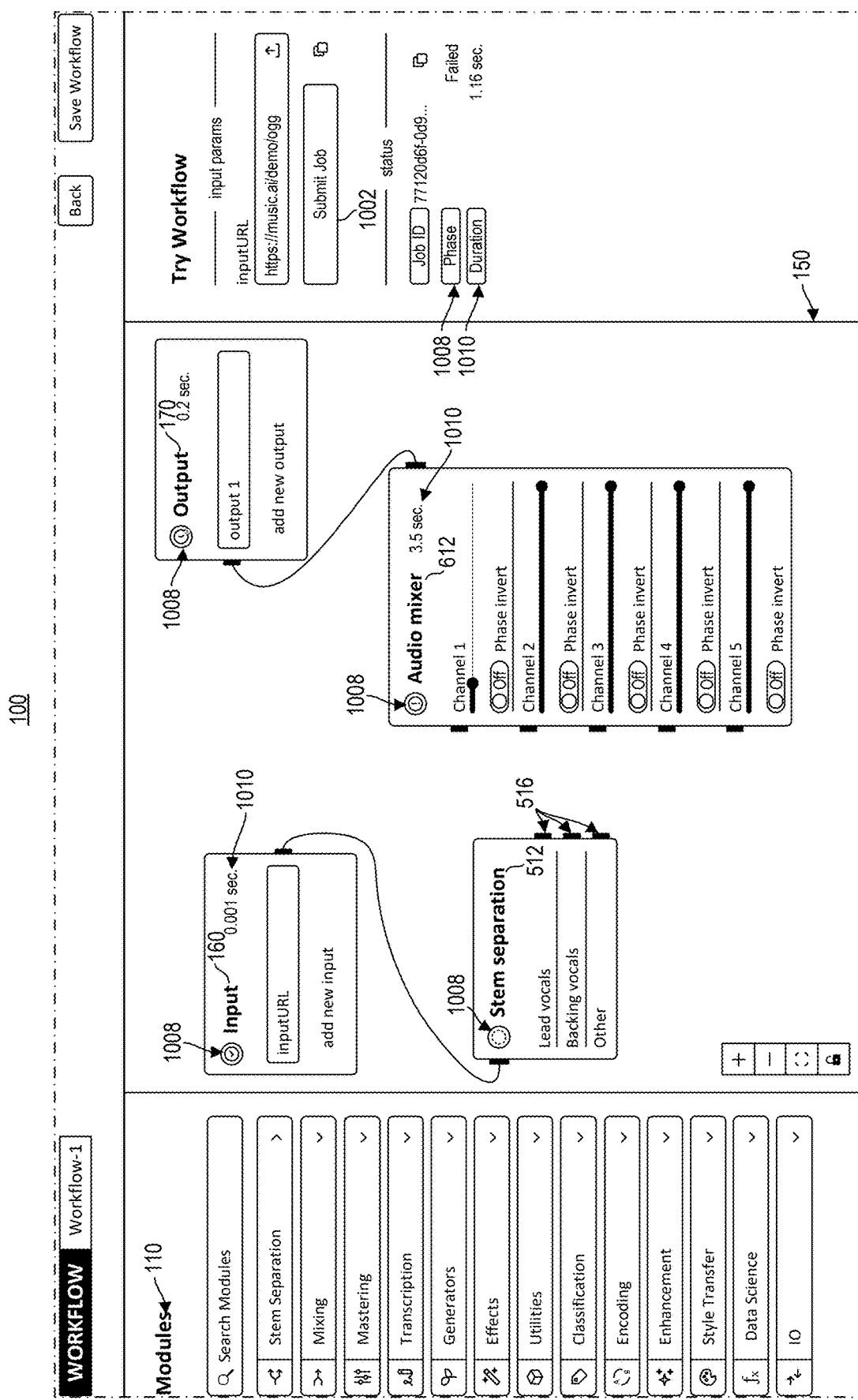

In some implementations, when an audio processing workflow defined via a workflow canvas 150 is invalid, the audio processing workflow generation interface 100 can indicate the invalidity to the user and/or indicate problem areas to the user to enable the user to address issues with the audio processing workflow within the workflow canvas 150. For instance, FIG. 11 illustrates an example in which the output nodes 516 of the representation 512 in the workflow canvas 150 are not connected to other nodes. In response to selection of the run workflow element 1002, the success indicators 1008 indicate that processing of the input audio signal via the workflow of the workflow canvas 150 has failed (via the "Failed" marker). In some instances, the success indicators 1008 can indicate performance aspects of individual audio processing modules represented in the workflow canvas 150. For instance, the success indicator 1008 of the input module 160 can indicate successful acquisition of the input audio signal (e.g., via a checkmark or other symbol, color, etc.), the success indicators 1008 of the representations 512 and 612 can indicate disconnection, failure to complete processing, failure to receive inputs, etc. (e.g., via warning or processing symbols, colors, etc.), and the success indicator 1008 of the output module 170 can indicate idleness (e.g., via a time lapse or pause symbol, color, etc.). Such functionality can enable users to readily ascertain problems with a workflow represented in a workflow canvas 150 and can enable users to quickly address such problems.

Although the examples discussed hereinabove focus, in at least some respects, on implementations in which an input node and an output node are represented as nodes on a workflow canvas, other configurations are within the scope of the present disclosure. For instance, an audio processing workflow generation interface may omit input and/or output nodes from the workflow canvas and instead provide input or output fields/regions in other portions of the audio processing workflow generation interface. In some examples, an audio processing workflow generation interface may omit input and output nodes, fields, or regions altogether, enabling construction of audio processing workflows for later processing of audio processing jobs (where input and/or output content/locations are defined) in other interfaces (e.g., a jobs interface, as described hereinabove).

Additional details will now be provided related to the various example audio processing modules that can be included in a module tray 110 of an audio processing workflow generation interface 100, in accordance with the disclosed subject matter. The following discussion will also describe representations of such audio processing modules that can be displayed on a workflow canvas 150, as well as processing settings that can be included and/or presented for modification in such representations. One will appreciate, in view of the present disclosure, that the specific audio processing modules described herein are provided by way of example only and that additional or alternative audio processing modules may be utilized in an audio processing workflow generation interface 100 within the scope of the disclosed subject matter.

Figure 12:
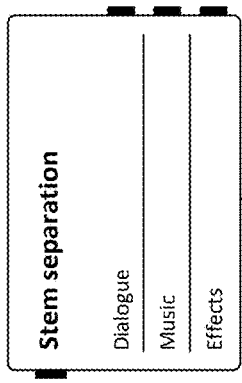
FIG. 12 illustrates a conceptual representation of stem separation modules of an audio processing workflow generation interface, in accordance with implementations of the disclosed subject matter.
Figure 12:
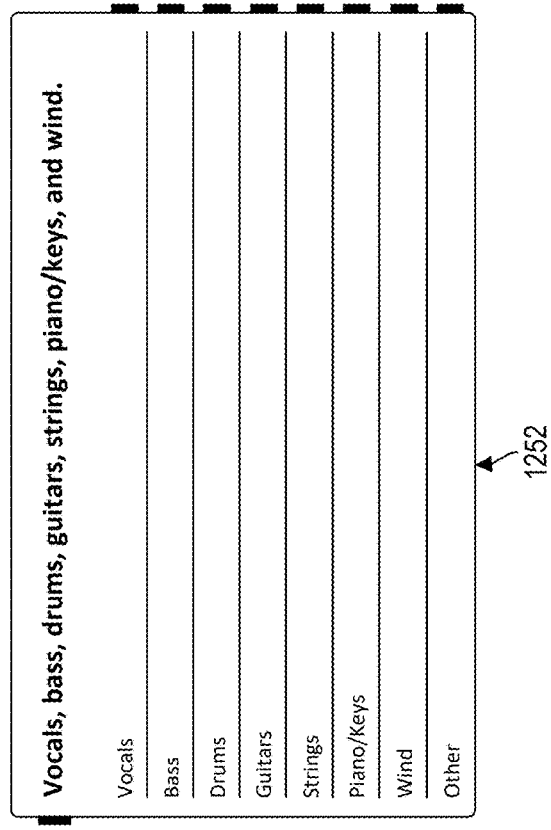
Figure 12:
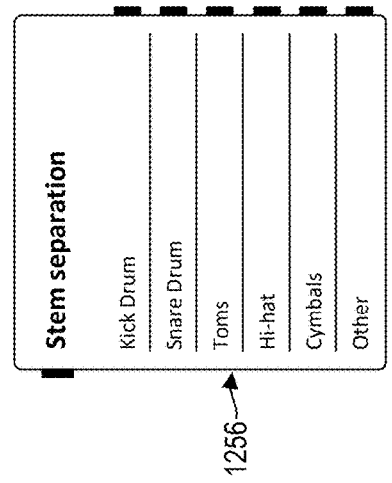

FIG. 12 illustrates a conceptual representation of stem separation modules 112. In particular, FIG. 12 illustrates a representation 1252 of a vocals, bass, drums, guitars, strings, piano/keys, and wind isolation module, a representation 1254 of a cinematic isolation module, and a representation 1256 of a drum parts isolation module. The representations 1252, 1254, and 1256 may be placed and displayed on a workflow canvas 150 in response to user input directed to corresponding modules on the module tray 110 and to the workflow canvas 150.

The vocals, bass, drums, guitars, strings, piano/keys, and wind isolation module can be configured to isolate vocals, bass, drums, guitars, strings, piano/keys, and wind stems from an input audio signal or file. The representation 1252 of FIG. 12 includes an input node for defining the input audio signal to be processed. The representation 1252 also includes output nodes corresponding to the different audio stems to be isolated (e.g., vocals, bass, drums, guitars, strings, piano/keys, wind, and other/remaining audio).

The cinematic isolation module can be configured to isolate the vocals/dialogue, music, and effects stems from an input audio signal or file. The representation 1254 of FIG. 12 includes an input node for defining the input audio signal to be processed. The representation 1254 also includes output nodes corresponding to the different audio stems to be isolated (e.g., dialogue, music, and effects).

The drum parts isolation module can be configured to isolate kick drum, snare drum, toms, hi-hat, cymbals, and other instrument stems from any drums audio signal or file. The representation 1256 of FIG. 12 includes an input node for defining the input drums audio signal to be processed. The representation 1256 also includes output nodes corresponding to the different audio stems to be isolated (e.g., kick drum, snare drum, toms, hi-hat, cymbals, other/remaining audio).

Figure 13:
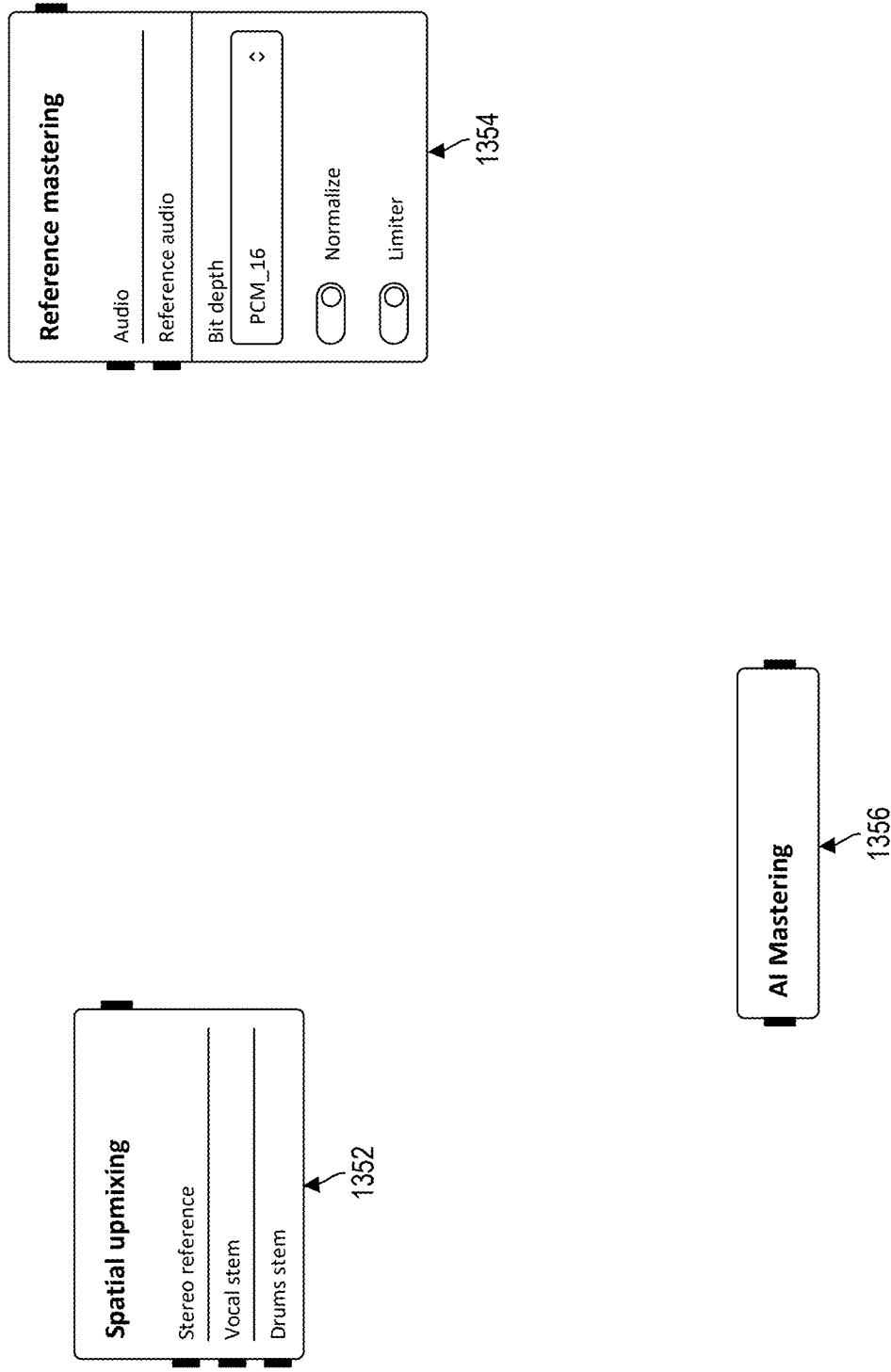
FIG. 13 illustrates a conceptual representation of mastering modules of an audio processing workflow generation interface, in accordance with implementations of the disclosed subject matter.

FIG. 13 illustrates a conceptual representation of mastering modules 116. In particular, FIG. 13 illustrates a representation 1352 of a spatial upmixing module, a representation 1354 of a reference mastering module, and a representation 1356 of an artificial intelligence (AI) mastering module. The representations 1352, 1354, and 1356 may be placed and displayed on a workflow canvas 150 in response to user input directed to corresponding modules on the module tray 110 and to the workflow canvas 150.

The spatial upmixing module can be configured to perform spatial mastering of stereo reference and stems. The representation 1352 of FIG. 13 includes input nodes for defining the input stereo reference signal, the input vocal stem signal, and the input drums stem signal. The representation 1352 also includes an output node for the providing the spatially mastered audio signal.

The reference mastering module can be configured to perform audio mastering using reference audio. The representation 1354 of FIG. 13 includes input nodes for defining the input audio signal and the reference audio signal. The representation 1354 also includes an output node for providing the reference mastered audio signal. The representation 1354 also includes processing settings for choosing the bit depth for the output mastered audio file (e.g., PCM_16, PCM_24, or FLOAT), toggling application of normalization to the audio during the reference mastering process, and toggling application of a limiter to the audio during the reference mastering process.

The AI mastering module can be configured to provide an AI generated masterized version of input audio. The representation 1356 of FIG. 13 includes an input node for defining the input audio signal to be processed. The representation 1356 also includes an output node for providing the AI mastered audio signal.

Figure 14:
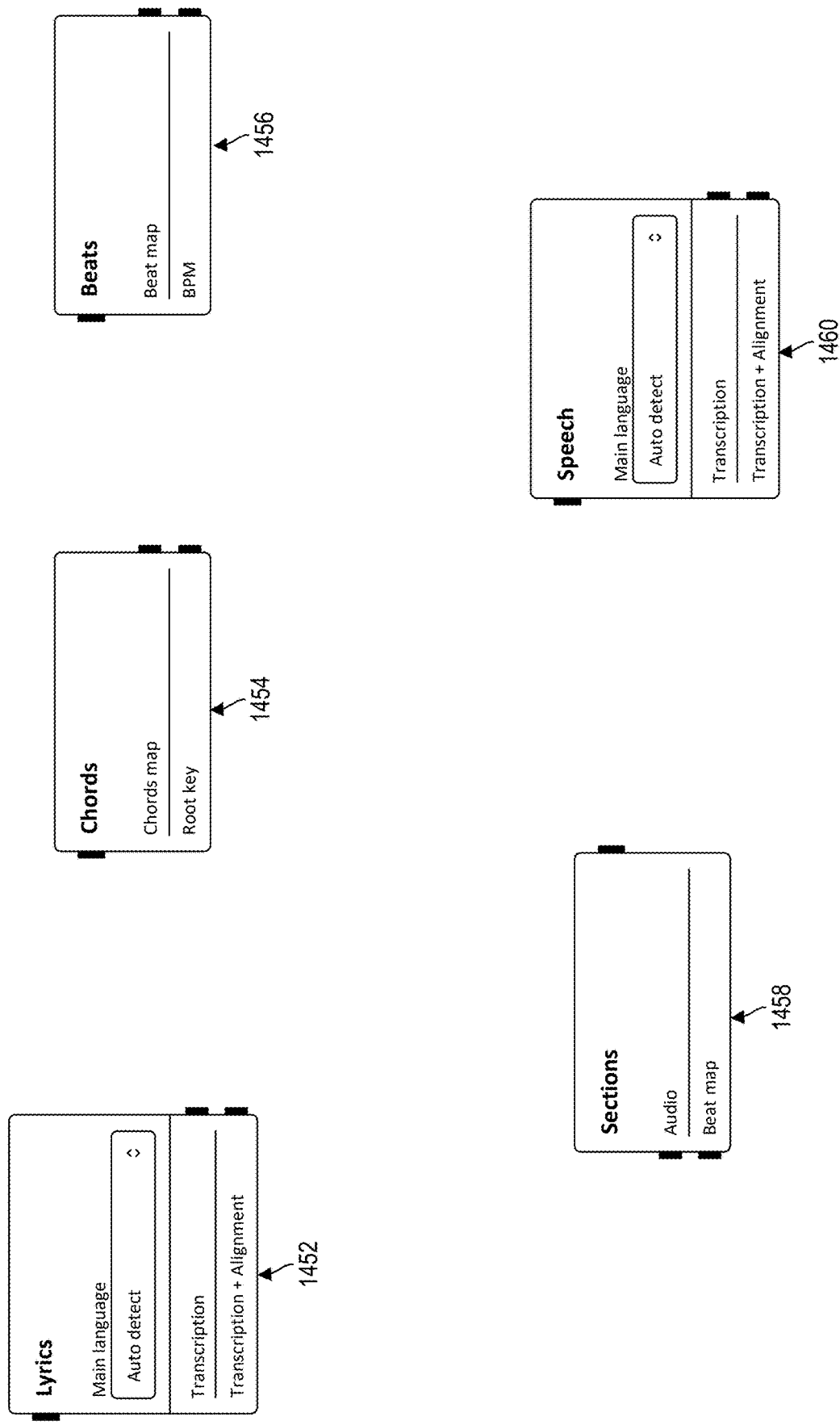
FIG. 14 illustrates a conceptual representation of transcription modules of an audio processing workflow generation interface, in accordance with implementations of the disclosed subject matter.

FIG. 14 illustrates a conceptual representation of transcription modules 118. In particular, FIG. 14 illustrates a representation 1452 of a lyrics transcription module, a representation 1454 of a chords transcription module, a representation 1456 of a beats transcription module, a representation 1458 of a sections transcription module, and a representation 1460 of a speech transcription module. The representations 1452, 1454, 1456, 1458, and 1460 may be placed and displayed on a workflow canvas 150 in response to user input directed to corresponding modules on the module tray 110 and to the workflow canvas 150.

The lyrics transcription module can be configured to transcribe and align lyrics from an input audio file, converting sung content into textual form. The representation 1452 of FIG. 14 includes an input node for defining the input audio signal to be processed. The representation 1452 also includes output nodes for providing (i) the transcription output and (ii) the transcription and alignment output. The representation 1452 also includes processing settings for choosing the expected singing language of the input audio signal (with an option for automatic language detection).

The chords transcription module can be configured to transcribe chords and root keys from input audio. The chord map output can comprise a timeline of chord annotations in different classes (e.g., complex jazz, simple jazz, complex pop, simple pop, etc.). The chord map can also comprise a timeline of bass chord annotations. The representation 1454 of FIG. 14 includes an input node for defining the input audio signal to be processed. The representation 1454 also includes output nodes for providing chords map output and root key output. The chord map output can comprise a timeline of chord annotations extracted from the input audio, where each annotation specifies the chord's start time, end time, and multiple chord classes. The root key output can comprise detected root key of the input audio (e.g., C major, A minor).

The beats transcription module can be configured to transcribe beats and calculate the tempo (beats per minute) from an input audio signal, which can provide useful information for reproducing track rhythm. The representation 1456 of FIG. 14 includes an input node for defining the input audio signal to be processed. The representation 1456 also includes output nodes for providing beat map output and BPM (beats per minute) output. The beat map output can comprise JSON output containing beat annotations extracted from the input audio. Each annotation can specify the beat's start time and beat number. The BPM output can comprise a numeric output that indicates the tempo of the input audio signal, measured as the number of beats occurring in one minute.

The sections transcription module can be configured to segment an audio signal into sections, where each section is annotated with a label. The representation 1458 of FIG. 14 includes input nodes for defining the input audio signal to be processed and an input beat map. The representation 1458 also includes an output node for providing section map output. The section map output can comprise a timeline containing the extracted sections from the input audio.

The speech transcription module can be configured to transcribe and align speech from an input audio file, converting spoken content into textual form. The representation 1460 of FIG. 14 includes an input node for defining the input audio signal to be processed. The representation 1460 also includes output nodes for providing (i) the transcription output and (ii) the transcription and alignment output. The representation 1460 also includes processing settings for choosing the expected spoken language of the input audio signal (with an option for automatic language detection).

Figure 15:
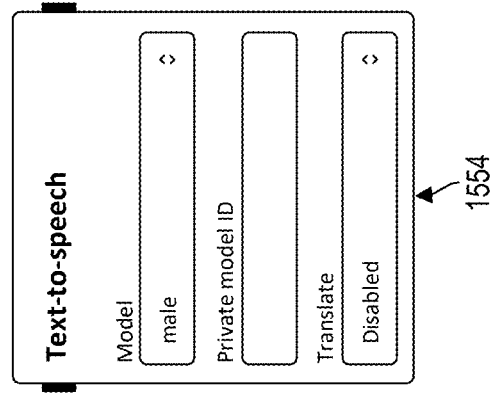
FIG. 15 illustrates a conceptual representation of generator modules of an audio processing workflow generation interface, in accordance with implementations of the disclosed subject matter.
Figure 15:
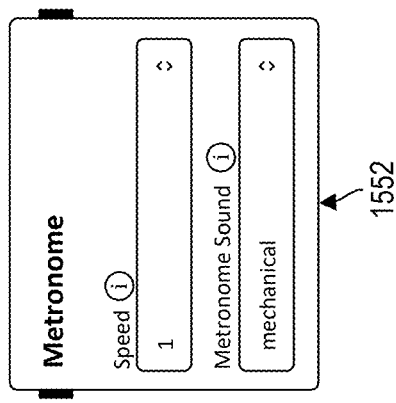

FIG. 15 illustrates a conceptual representation of generator modules 120. In particular, FIG. 15 illustrates a representation 1552 of a metronome module and a representation 1554 of a text-to-speech module. The representations 1552 and 1554 may be placed and displayed on a workflow canvas 150 in response to user input directed to corresponding modules on the module tray 110 and to the workflow canvas 150.

The metronome module can be configured to generate metronome audio based on an input beat map, allowing customization of speed and choice of metronome sound. The representation 1552 of FIG. 15 includes an input node for defining the beat map input. The representation 1552 also includes an output node for providing the generated metronome audio output. The representation 1552 also includes processing settings for defining the speed of the metronome audio relative to the beat map speed (e.g., with available 0.5×, 1×, and 2× speed options) and the metronome sound, such as mechanical, cowbell, electronic, clap, etc.

The text-to-speech module can be configured to convert text to speech with the option to translate to other languages. The representation 1554 of FIG. 15 includes an input node for defining input text to be processed. The representation 1554 also includes an output node for providing the generated synthesized speech audio. The representation 1552 also includes processing settings for selecting a voice model (e.g., a male voice model, a female voice model, or a custom/private voice model) or selecting a translation language (with an option to disable or refrain from translating).

Figure 16:
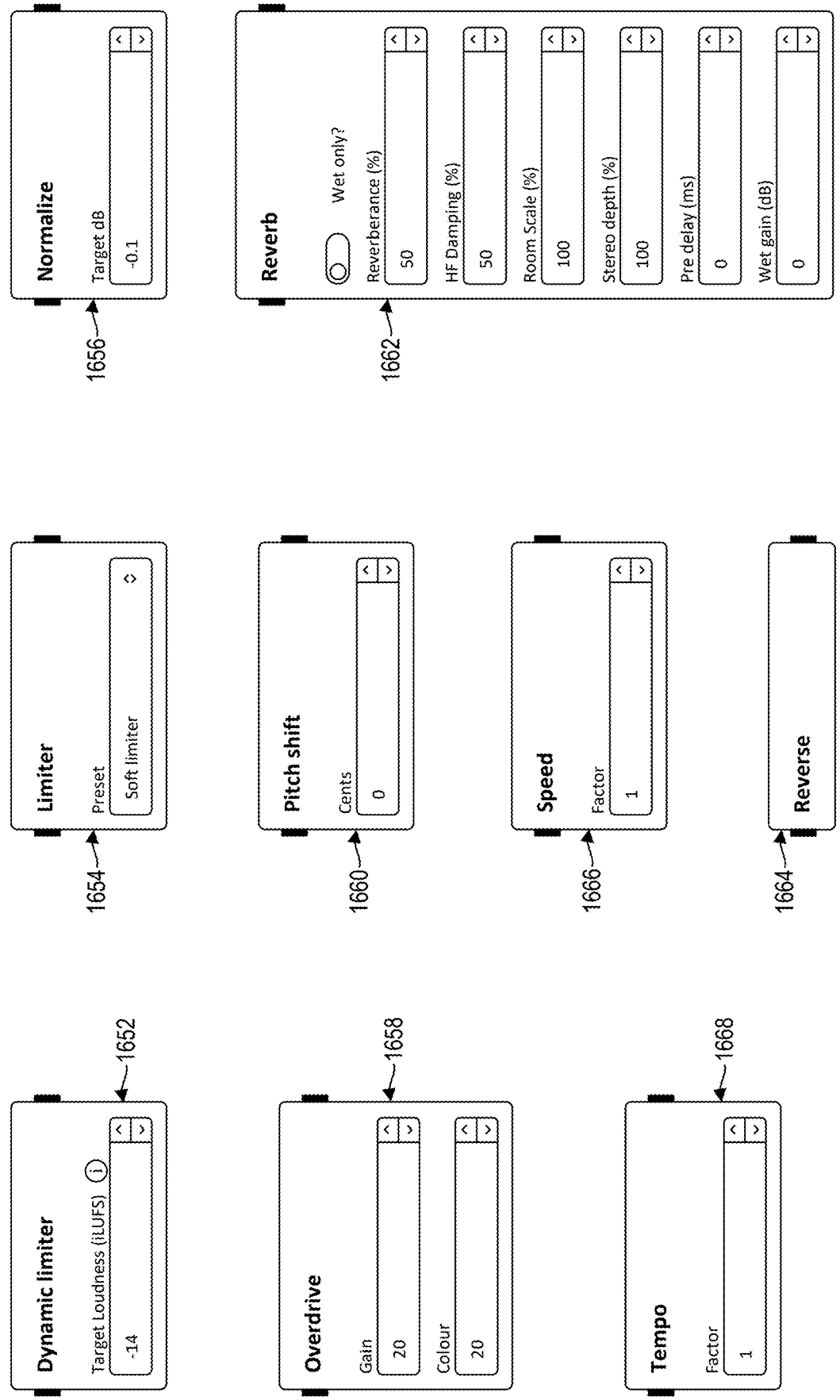
FIG. 16 illustrates a conceptual representation of effects modules of an audio processing workflow generation interface, in accordance with implementations of the disclosed subject matter.

FIG. 16 illustrates a conceptual representation of effects modules 122. In particular, FIG. 16 illustrates a representation 1652 of a dynamic limiter module, a representation 1654 of a limiter module, a representation 1656 of a normalize module, a representation 1658 of an overdrive module, a representation 1660 of a pitch shift module, a representation 1662 of a reverb module, a representation 1664 of a reverse module, a representation 1666 of a speed module, and a representation 1668 of a tempo module. The representations 1652, 1654, 1656, 1658, 1660, 1662, 1664, 1666, and 1668 may be placed and displayed on a workflow canvas 150 in response to user input directed to corresponding modules on the module tray 110 and to the workflow canvas 150.

The dynamic limiter module can be configured to apply a dynamic range limiter that controls and limits the loudness (iLUFS) of the input audio signal while preserving the dynamic range. The representation 1652 of FIG. 16 includes an input node for defining the input audio signal to be processed. The representation 1652 also includes an output node for providing the processed audio signal with the applied dynamic limiter. The representation 1652 also includes processing settings for defining the target loudness (iLUFS) (e.g., ranging from −24 to −1).

The limiter module can be configured to apply a limiter to an input audio signal that selectively controls the signal peaks while preserving the sound quality. The representation 1654 of FIG. 16 includes an input node for defining the input audio signal to be processed. The representation 1654 also includes an output node for providing the processed audio signal with the applied limiter. The representation 1654 also includes processing settings for selecting a limiter preset (e.g., a soft limiter, a hard limiter).

The normalize module can be configured to apply normalization to an input audio signal, adjusting peak volume levels to a specified decibel (dB) value while maintaining the dynamics and balance of the input audio signal. The representation 1656 of FIG. 16 includes an input node for defining the input audio signal to be processed. The representation 1656 also includes an output node for providing the processed audio signal with the applied normalization. The representation 1656 also includes processing settings for specifying the target decibel level for the normalized audio.

The overdrive module can be configured to apply an overdrive effect to an input audio signal to amplify its sound, which can add a rich, powerful, and/or slightly distorted tone. The representation 1658 of FIG. 16 includes an input node for defining the input audio signal to be processed. The representation 1658 also includes an output node for providing the processed audio signal with the applied overdrive effect. The representation 1658 also includes processing settings for specifying the gain of the overdrive effect (e.g., ranging from 0% to 100%) and the color or tone of the overdrive effect (e.g., ranging from 0% to 100%).

The pitch shift module can be configured to adjust the pitch of an input audio signal by shifting it up or down by a specified number of cents. The representation 1660 of FIG. 16 includes an input node for defining the input audio signal to be processed. The representation 1660 also includes an output node for providing the processed audio signal with the applied pitch shift. The representation 1660 also includes processing settings for defining the number of cents (e.g., $\frac{1}{100}^{th}$ of a semitone) to shift the pitch of the input audio (e.g., ranging from −1000 to 1000).

The reverb module can be configured to add a reverb effect to an audio signal, simulating the sound of reflections and reverberations within a room, hall, or space while allowing customization of various parameters. The representation 1662 of FIG. 16 includes an input node for defining the input audio signal to be processed. The representation 1662 also includes an output node for providing the output audio signal with the applied reverb effect. The representation 1662 also includes processing settings for defining whether to output the wet (processed) signal only, the percentage of reverberance (e.g., ranging from 0% to 100%), the percentage of high-frequency (HF) damping (e.g., ranging from 0% to 100%), the room scale for simulating the size of the room (e.g., ranging from 0% to 100%), the percentage of stereo depth for creating a wider or narrow stereo image (e.g., ranging from 0% to 100%), the pre delay (e.g., in milliseconds) before the reverb effect is applied (e.g., from 0 ms to 500 ms), and the wet gain indicating the gain (in dB) of the wet (processed) signal (e.g., ranging from −10 dB to 10 dB).

The reverse module can be configured to reverse the input audio signal so that it plays backward from the end to the beginning without affecting other audio properties. The representation 1664 of FIG. 16 includes an input node for defining the input audio signal to be processed. The representation 1664 also includes an output node for defining the processed audio signal with the applied reverse effect.

The speed module can be configured to adjust the playback speed of the input audio signal using a customizable factor to modify both the input audio signal's tempo and pitch. The representation 1666 of FIG. 16 includes an input node for defining the input audio signal to be processed. The representation 1666 also includes an output node for defining the processed audio signal with the applied speed effect. The representation 1666 also includes processing settings for defining the factor (e.g., within a range of 0 to 10) to scale the playback speed of the input audio signal.

The tempo module can be configured to adjust the tempo of the input audio signal using a customizable factor. The representation 1668 of FIG. 16 includes an input node for defining the input audio signal to be processed. The representation 1668 also includes an output node for defining the processed audio signal with the applied tempo effect. The representation 1668 also includes processing settings for defining the factor (e.g., within a range of 0 to 10) to scale the playback tempo of the input audio signal.

Figure 17:
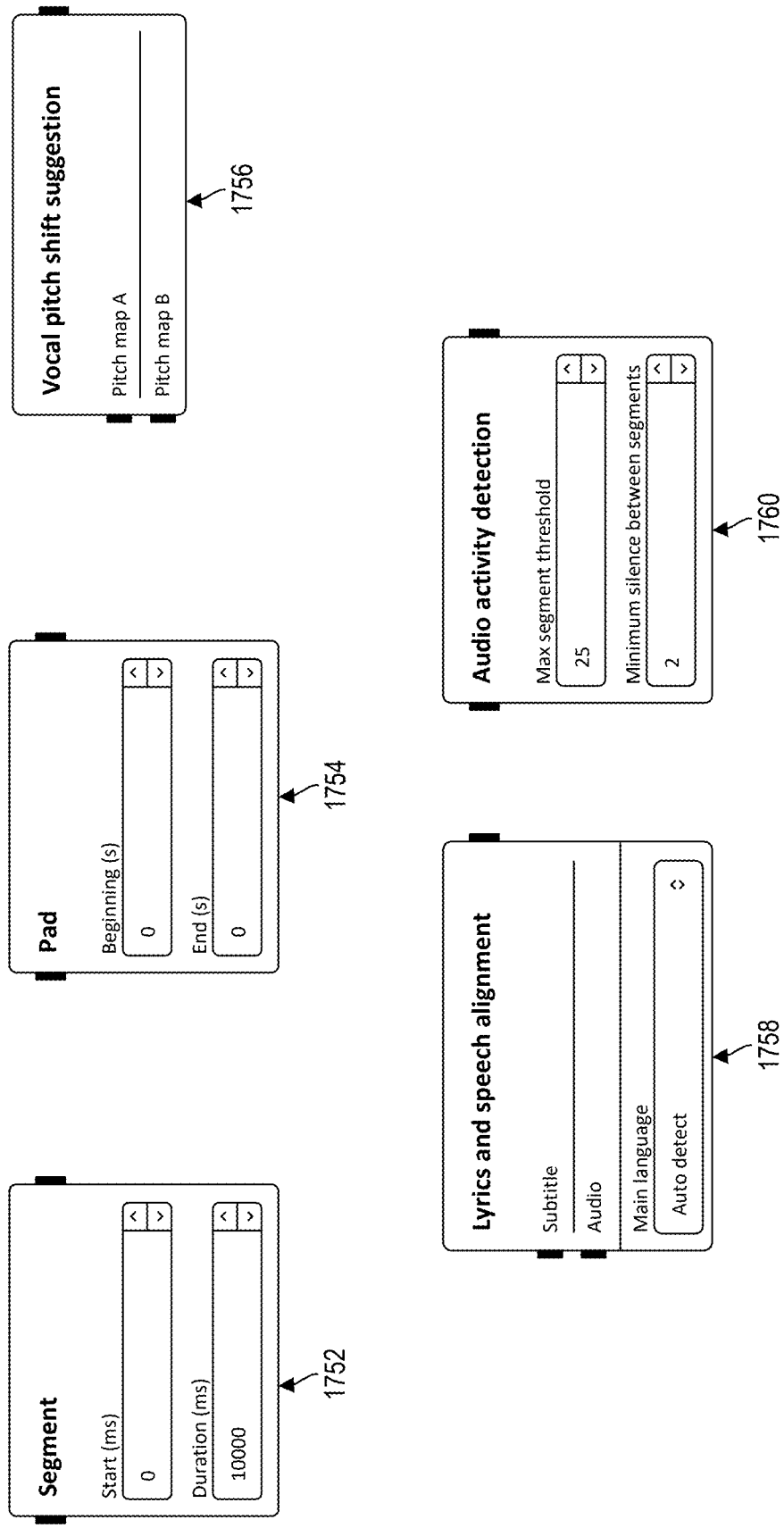
FIG. 17 illustrates a conceptual representation of utility modules of an audio processing workflow generation interface, in accordance with implementations of the disclosed subject matter.

FIG. 17 illustrates a conceptual representation of utilities modules 124. In particular, FIG. 17 illustrates a representation 1752 of a segment module, a representation 1754 of a pad module, a representation 1756 of a vocal pitch shift suggestion module, a representation 1758 of a lyrics and speech alignment module, and a representation 1760 of an audio activity detection module. The representations 1752, 1754, 1756, 1758, and 1760 may be placed and displayed on a workflow canvas 150 in response to user input directed to corresponding modules on the module tray 110 and to the workflow canvas 150.

The segment module can be configured to extract a specified segment from an input audio signal, retaining only the chosen duration starting from a designated point in time. The representation 1752 of FIG. 17 includes an input node for defining the input audio signal to be processed. The representation 1752 also includes an output node for providing audio output containing the extracted segment as specified by the start and duration parameters. The representation 1752 also includes processing settings for defining the start point (e.g., in ms) from which the segment will be extracted and the duration (e.g., in ms) of the segment to be extracted.

The pad module can be configured to add silence to the beginning and/or end of an input audio signal to create space before and/or after the audio signal. The representation 1754 of FIG. 17 includes an input node for defining the input audio signal to be processed. The representation 1754 also includes an output node for providing the processed audio output with the applied pad effect. The representation 1754 also includes processing settings for defining the duration (e.g., in seconds) of silence to add to the beginning of the input audio signal and the duration (e.g., in seconds) of silence to add to the end of the input audio signal.

The vocal pitch shift suggestion module can be configured to compute pitch shift suggestions based on a vocal range map and an input audio target. The representation 1756 of FIG. 17 includes input nodes for defining vocal pitch maps (e.g., A and B) for processing. The representation 1756 also includes an output node for providing the suggested pitch shift based on the provided vocal pitch maps (e.g., in JSON format).

The lyrics and speech alignment module can be configured to process audio containing speech or singing to match them with corresponding subtitle lines or words, such as by generating word-by-word and/or line-by-line aligned data in JSON format. The representation 1758 of FIG. 17 includes input nodes for defining a subtitle file/source (e.g., in a generic subtitle format) for alignment with audio and the input audio signal containing speech or singing for alignment with the subtitles. The representation 1758 also includes an output node for providing the transcribed and aligned subtitle content (e.g., in a generic subtitle format). The representation 1758 also includes processing settings for defining the main language of the input audio (e.g., with an option to automatically detect the main language).

The audio activity detection module can be configured to generate a timeline containing audio activity. The representation 1760 of FIG. 17 includes an input node for defining the input audio signal to be processed. The representation 1760 also includes an output node for providing timeline output (e.g., in JSON format) containing the temporal windows where activity was detected with start and end times (e.g., in seconds). The representation 1760 also includes processing settings for determining the maximum segment threshold or the maximum duration of a segment to trigger detection (e.g., in seconds) and the minimum silence between segments or the minimum duration of tolerated continuous silence between two audio events (e.g., in seconds).

Figure 18:
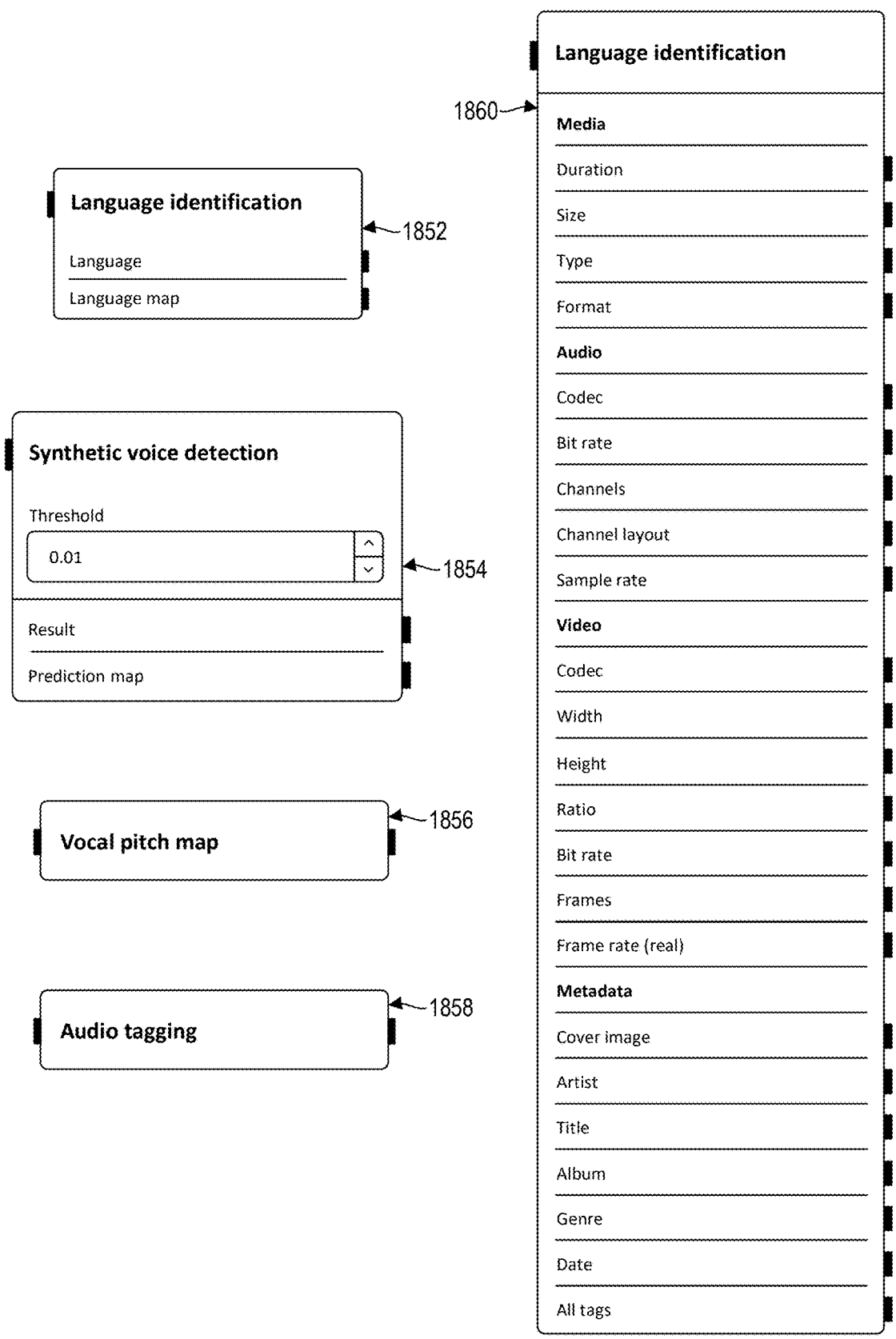
FIG. 18 illustrates a conceptual representation of classification modules of an audio processing workflow generation interface, in accordance with implementations of the disclosed subject matter.

FIG. 18 illustrates a conceptual representation of classification modules 126. In particular, FIG. 18 illustrates a representation 1852 of a language identification module, a representation 1854 of a synthetic voice detection module, a representation 1856 of a vocal pitch map module, a representation 1858 of an audio tagging module, and a representation 1860 of a file metadata module. The representations 1852, 1854, 1856, 1858, and 1860 may be placed and displayed on a workflow canvas 150 in response to user input directed to corresponding modules on the module tray 110 and to the workflow canvas 150.

The language identification module can be configured to detect the spoken language of an input audio signal. The representation 1852 of FIG. 18 includes an input node for defining the input audio signal to be processed. The representation 1852 also includes output nodes for providing a language output (e.g., as a string) with a language code of the main language detected in the input audio and a language map (e.g., a JSON file) containing the language of the input audio.

The synthetic voice detection module can be configured to classify whether input audio includes AI-generated audio content (e.g., focused on AI-generated vocals). The representation 1854 of FIG. 18 includes an input node for defining the input audio signal to be processed. The representation 1854 also includes output nodes for providing the prediction result (e.g., as a string) and a prediction map (e.g., a JSON file) that includes a timeline of predictions for each window of input audio. The representation 1854 also includes processing settings for defining a numerical threshold of model sensitivity.

The vocal pitch map module can be configured to compute vocal pitch from input audio and provide a pitch map containing the presence of the detected pitch (e.g., for each MIDI key from 0 to 127). The representation 1856 of FIG. 18 includes an input node for defining the input audio signal to be processed. The representation 1856 also includes an output node for providing the pitch map output.

The audio tagging module can be configured to classify audio segments. The representation 1858 of FIG. 18 includes an input node for defining the input audio signal to be processed. The representation 1858 also includes an output mode for providing a tags map (e.g., including segment classes).

The file metadata module can be configured to extract metadata from an audio or media file. The representation 1860 of FIG. 18 includes an input node for defining the input audio signal to be processed. The representation 1860 also includes output nodes for providing the duration of the input file, the size of the input file, the type of the input file (e.g., a string indicating whether the input file comprises audio or video), the format of the input file, the audio codec of the input file, the audio bit rate of the input file, the audio channels of the input file, the audio channel layout (e.g., mono, stereo) of the input file, the audio sample rate of the input file, the video codec of the input file, the video width of the input file, the video height of the input file, the video aspect ratio of the input file, the video bit rate of the input fille, the video frames (e.g., quantity) of the input file, the video frame rate of the input file, the cover image of the input file, the artist of the input file, the title of the input file, the album of the input file, the genre of the input file, the date of the input file, and the tags of the input file (e.g., in JSON format).

Figure 19:
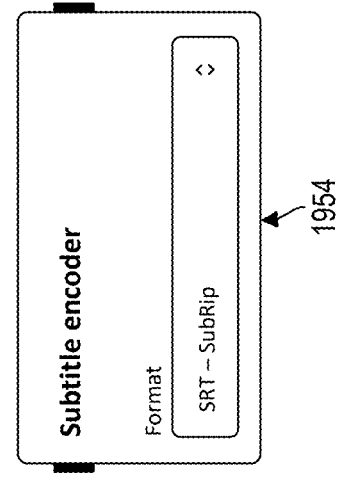
FIG. 19 illustrates a conceptual representation of encoding modules of an audio processing workflow generation interface, in accordance with implementations of the disclosed subject matter.
Figure 19:
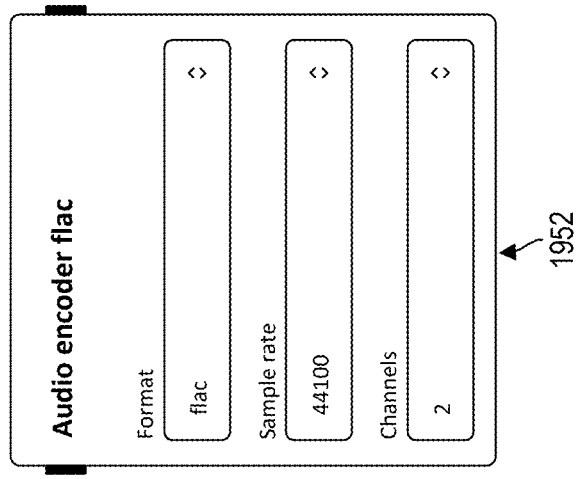

FIG. 19 illustrates a conceptual representation of encoding modules 128. In particular, FIG. 19 illustrates a representation 1952 of an audio encoder module and a representation 1954 of a subtitle encoder module. The representations 1952 and 1954 may be placed and displayed on a workflow canvas 150 in response to user input directed to corresponding modules on the module tray 110 and to the workflow canvas 150.

The audio encoder module can be configured to convert and encode an input audio signal to a different format, bit rate, sample rate, and/or number of channels (e.g., supporting various common audio codecs and formats). The representation 1952 of FIG. 19 includes an input node for defining the input audio signal to be processed. The representation 1952 also includes an output node for providing the converted and encoded audio output. The representation 1952 also includes processing settings for defining the audio format for the audio output (e.g., MP3, M4A, WAV, AAC, FLAC, OGG, WMA, AIFF, ALAC, AMR, APE, AU, DCT, DSS, DVF, GSM, IKLAX, IVS, M4P, MMF, MPC, MSV, NMF, NSF, OPUS, RA, RM, RAW, RF64, SLN, TTA, VOX, VOC, W64, WEBM, WV, 8SVX, CDA, and/or others), the sample rate for the audio output to control the resolution and quality of the audio output (e.g., 11025 Hz, 16000 Hz, 22050 Hz, 44100 Hz, 48000 Hz, 96000 Hz), and the number of audio channels for the output file (e.g., mono (1) or stereo (2)).

The subtitle encoder module can be configured to convert and encode an input subtitle file to a different format. The representation 1954 of FIG. 19 includes an input node for defining the input subtitle file to be processed. The representation 1954 also includes an output node for providing the converted and encoded output subtitle file. The representation 1954 also includes processing settings for defining the subtitle format for the output file (e.g., LRC, TXT, SRT, VTT, and/or others).

Figure 20:
FIG. 20 illustrates a conceptual representation of enhancement, style transfer, and data science modules of an audio processing workflow generation interface, in accordance with implementations of the disclosed subject matter.

FIG. 20 illustrates a conceptual representation of enhancement modules 130, style transfer modules 132, and data science modules 134. In particular, FIG. 20 illustrates representations of enhancement modules 130 including a representation 2052 of a vocal upsampling module and a representation 2054 of a speech noise suppression module. FIG. 20 also illustrates a representation of a style transfer modules 132 including a representation 2056 of a voice transfer module. FIG. 20 furthermore illustrates a representation of a data science modules 134 including a representation 2058 of a source separation metrics module. The representations 2052, 2054, 2056, and 2058 may be placed and displayed on a workflow canvas 150 in response to user input directed to corresponding modules on the module tray 110 and to the workflow canvas 150.

The vocal upsampling module can be configured to upsample voice recordings for speech and/or singing to 48 kHz. The representation 2052 of FIG. 20 includes an input node for defining the input audio signal to be processed. The representation 2052 also includes an output node for providing the upsampled audio output.

The speech noise suppression module can be configured to remove background noise from a voice recording. The representation 2054 of FIG. 20 includes an input node for defining the input audio signal to be processed. The representation 2054 also includes an output node for providing output audio containing the voice recording after processing and removal of high-frequency noise.

The voice transfer module can be configured to transfer the timbre from one voice to another. The representation 2056 of FIG. 20 includes an input node for defining the input voice stem to be processed. The representation 2056 also includes an output node for providing the restyled voice stem output. The representation 2056 also includes processing settings for defining the target voice model (e.g., a male voice model, a female voice model, a custom voice model) and the pitch shift (e.g., in semitones, within a range of −24 to 24).

The source separation metrics module can be configured to provide various audio source separation metrics. The representation 2058 of FIG. 20 includes input nodes for defining the ground truth input audio and the predicted input audio. The representation 2058 also includes output nodes for providing the audio source separation metrics, such as signal-to-distortion ratio (SDR), signal-invariant signal-to-distortion ratio (SI-SDR), signal-to-noise ratio (SNR), and scale-invariant signal-to-noise ratio (SI-SNR).

Figure 21:
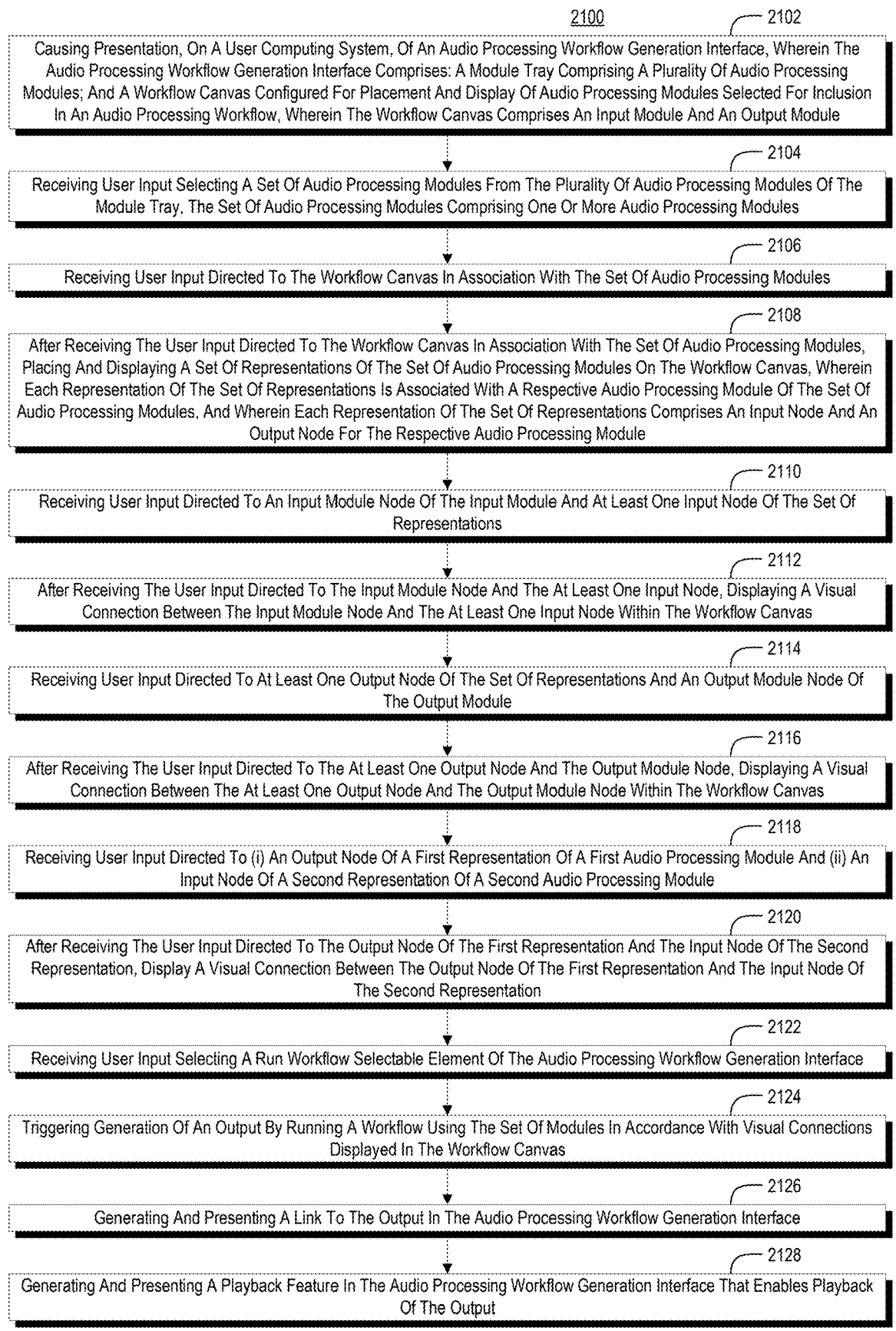
FIG. 21 illustrates an example flow diagram depicting acts associated with facilitating audio processing.

FIG. 21 illustrates an example flow diagram 2100 depicting acts associated with facilitating audio processing. The acts described with reference to FIG. 21 can be performed using one or more components of one or more systems 2200 described hereinafter with reference to FIG. 22, such as processor(s) 2202, storage 2204, sensor(s) 2206, I/O system(s) 2208, communication system(s) 2210, remote system(s) 2212, etc. Although the acts may be described and/or shown in a certain order, no specific ordering is required unless explicitly stated or if the performance of one act depends on the completion of another.

Act 2102 of flow diagram 2100 includes causing presentation, on a user computing system, of an audio processing workflow generation interface, wherein the audio processing workflow generation interface comprises: a module tray comprising a plurality of audio processing modules; and a workflow canvas configured for placement and display of audio processing modules selected for inclusion in an audio processing workflow, wherein the workflow canvas comprises an input module and an output module. In some instances, the plurality of audio processing modules comprises one or more stem separation modules, one or more mixing modules, one or more mastering modules, one or more transcription modules, one or more generator modules, one or more effects modules, on or more utilities modules, one or more classification modules, one or more encoding modules, one or more enhancement modules, one or more style transfer modules, one or more data science modules, and one or more input/output modules. In some implementations, the module tray comprises a module search field that enables searching among the plurality of audio processing modules. In some embodiments, the input module comprises a uniform resource locator (URL) field for defining a workflow input. In some instances, the output module comprises an output name field for defining a workflow output name. In some implementations, the audio processing workflow generation interface comprises view modification selectable elements that, when selected, trigger changing of a view of the set of representations displayed on the workflow canvas. In some embodiments, the audio processing workflow generation interface comprises an interactivity lock selectable element that, when selected, triggers locking of modifiability of the set of representations displayed on the workflow canvas. In some examples, the audio processing workflow generation interface comprises a run workflow selectable element that, when selected, triggers generation of an output by running a workflow using the set of modules in accordance with visual connections displayed in the workflow canvas Act 2104 of flow diagram 2100 includes receiving user input selecting a set of audio processing modules from the plurality of audio processing modules of the module tray, the set of audio processing modules comprising one or more audio processing modules.

Act 2106 of flow diagram 2100 includes receiving user input directed to the workflow canvas in association with the set of audio processing modules. In some instances, the user input selecting the set of audio processing modules and the user input directed to the workflow canvas in association with the set of audio processing modules comprises dragging input that drags the set of audio processing modules onto the workflow canvas.

Act 2108 of flow diagram 2100 includes, after receiving the user input directed to the workflow canvas in association with the set of audio processing modules, placing and displaying a set of representations of the set of audio processing modules on the workflow canvas, wherein each representation of the set of representations is associated with a respective audio processing module of the set of audio processing modules, and wherein each representation of the set of representations comprises an input node and an output node for the respective audio processing module. In some implementations, one or more representations of the set of representations comprise modifiable processing settings for the respective audio processing module(s).

Act 2110 of flow diagram 2100 includes receiving user input directed to an input module node of the input module and at least one input node of the set of representations. In some embodiments, the input module node is associated with the URL field. In some examples, the input module comprises an add input selectable element that, when selected, triggers addition of (i) an additional URL field for defining an additional workflow input and (ii) an additional input module node associated with the additional URL field.

Act 2112 of flow diagram 2100 includes, after receiving the user input directed to the input module node and the at least one input node, displaying a visual connection between the input module node and the at least one input node within the workflow canvas.

Act 2114 of flow diagram 2100 includes receiving user input directed to at least one output node of the set of representations and an output module node of the output module. In some examples, the output name field is associated with the output module node. In some instances, the output module comprises an add output selectable element that, when selected, triggers addition of (i) an additional output name field and (ii) an additional output module node associated with the additional output name field.

Act 2116 of flow diagram 2100 includes, after receiving the user input directed to the at least one output node and the output module node, displaying a visual connection between the at least one output node and the output module node within the workflow canvas.

Act 2118 of flow diagram 2100 includes receiving user input directed to (i) an output node of a first representation of a first audio processing module and (ii) an input node of a second representation of a second audio processing module.

Act 2120 of flow diagram 2100 includes, after receiving the user input directed to the output node of the first representation and the input node of the second representation, display a visual connection between the output node of the first representation and the input node of the second representation.

Act 2122 of flow diagram 2100 includes receiving user input selecting a run workflow selectable element of the audio processing workflow generation interface.

Act 2124 of flow diagram 2100 includes triggering generation of an output by running a workflow using the set of modules in accordance with visual connections displayed in the workflow canvas.

Act 2126 of flow diagram 2100 includes generating and presenting a link to the output in the audio processing workflow generation interface.

Act 2128 of flow diagram 2100 includes generating and presenting a playback feature in the audio processing workflow generation interface that enables playback of the output.

Figure 22:
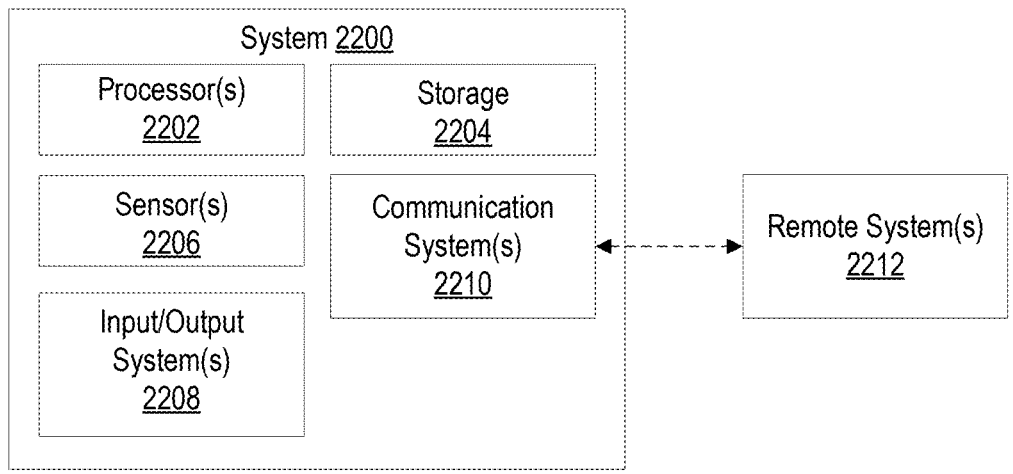
FIG. 22 depicts example components of a system that may comprise or be configurable to perform various embodiments.

FIG. 22 illustrates example components of a system 2200 that may comprise or implement aspects of one or more disclosed embodiments. For example, FIG. 22 illustrates an implementation in which the system 2200 includes processor(s) 2202, storage 2204, sensor(s) 2206, I/O system(s) 2208, and communication system(s) 2210. Although FIG. 22 illustrates a system 2200 as including particular components, one will appreciate, in view of the present disclosure, that a system 2200 may comprise any number of additional or alternative components.

The processor(s) 2202 may comprise one or more sets of electronic circuitries that include any number of logic units, registers, and/or control units to facilitate the execution of computer-readable instructions (e.g., instructions that form a computer program). Such computer-readable instructions may be stored within storage 2204. The storage 2204 may comprise physical system memory and may be volatile, non-volatile, or some combination thereof. Furthermore, storage 2204 may comprise local storage, remote storage (e.g., accessible via communication system(s) 2210 or otherwise), or some combination thereof. Additional details related to processors (e.g., processor(s) 2202) and computer storage media (e.g., storage 2204) will be provided hereinafter.

As will be described in more detail, the processor(s) 2202 may be configured to execute instructions stored within storage 2204 to perform certain actions. In some instances, the actions may rely at least in part on communication system(s) 2210 for receiving data from remote system(s) 2212, which may include, for example, separate systems or computing devices, sensors, servers, and/or others. The communications system(s) 2210 may comprise any combination of software or hardware components that are operable to facilitate communication between on-system components/devices and/or with off-system components/devices. For example, the communications system(s) 2210 may comprise ports, buses, or other physical connection apparatuses for communicating with other devices/components. Additionally, or alternatively, the communications system(s) 2210 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 22 illustrates that a system 2200 may comprise or be in communication with sensor(s) 2206. Sensor(s) 2206 may comprise any device for capturing or measuring data representative of perceivable phenomenon. By way of non-limiting example, the sensor(s) 2206 may comprise one or more image sensors, microphones, thermometers, barometers, magnetometers, accelerometers, gyroscopes, and/or others.

Furthermore, FIG. 22 illustrates that a system 2200 may comprise or be in communication with I/O system(s) 2208. I/O system(s) 2208 may include any type of input or output device such as, by way of non-limiting example, a display, a touch screen, a mouse, a keyboard, a controller, and/or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "computer-readable recording media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., fon-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for facilitating audio processing, comprising: one or more processors; and
one or more computer-readable recording media that store instructions that are executable by the one or more processors to configure the system to:
cause presentation, on a user computing system, of an audio processing workflow generation interface, wherein the audio processing workflow generation interface comprises:
a module tray comprising a plurality of audio processing modules; and
a workflow canvas configured for placement and display of audio processing modules selected for inclusion in an audio processing workflow, wherein the workflow canvas comprises an input module and an output module, wherein the input module comprises a uniform resource identifier field for defining an audio signal workflow input;
receive user input selecting a set of audio processing modules from the plurality of audio processing modules of the module tray, the set of audio processing modules comprising one or more audio processing modules;
receive user input directed to the workflow canvas in association with the set of audio processing modules;
after receiving the user input directed to the workflow canvas in association with the set of audio processing modules, place and display a set of representations of the set of audio processing modules on the workflow canvas, wherein each representation of the set of representations is associated with a respective audio processing module of the set of audio processing modules, and wherein each representation of the set of representations comprises an input node and an output node for the respective audio processing module;
receive user input directed to an input module node of the input module and at least one input node of the set of representations, wherein the input module node is associated with the uniform resource identifier field, wherein the input module comprises an add input selectable element that, when selected, triggers addition of (i) an additional uniform resource identifier field for defining an additional audio signal workflow input and (ii) an additional input module node associated with the additional uniform resource identifier field;
after receiving the user input directed to the input module node and the at least one input node, display a visual connection between the input module node and the at least one input node within the workflow canvas;
receive user input directed to at least one output node of the set of representations and an output module node of the output module; and
after receiving the user input directed to the at least one output node and the output module node, display a visual connection between the at least one output node and the output module node within the workflow canvas.

2. The system of claim 1, wherein the plurality of audio processing modules comprises one or more stem separation modules, one or more mixing modules, one or more mastering modules, one or more transcription modules, one or more generator modules, one or more effects modules, on or more utilities modules, one or more classification modules, one or more encoding modules, one or more enhancement modules, one or more style transfer modules, one or more data science modules, and one or more input/output modules.

3. The system of claim 1, wherein one or more representations of the set of representations comprise modifiable processing settings for the respective audio processing module(s).

4. The system of claim 1, wherein the module tray comprises a module search field that enables searching among the plurality of audio processing modules.

5. The system of claim 1, wherein the output module comprises an output name field for defining a workflow output name, and wherein the output name field is associated with the output module node.

6. The system of claim 5, wherein the output module comprises an add output selectable element that, when selected, triggers addition of (i) an additional output name field and (ii) an additional output module node associated with the additional output name field.

7. The system of claim 1, wherein the user input selecting the set of audio processing modules and the user input directed to the workflow canvas in association with the set of audio processing modules comprises dragging input that drags the set of audio processing modules onto the workflow canvas.

8. The system of claim 1, wherein the audio processing workflow generation interface comprises view modification selectable elements that, when selected, trigger changing of a view of the set of representations displayed on the workflow canvas.

9. The system of claim 1, wherein the audio processing workflow generation interface comprises an interactivity lock selectable element that, when selected, triggers locking of modifiability of the set of representations displayed on the workflow canvas.

10. The system of claim 1, wherein the set of audio processing modules comprises at least a first audio processing module and a second audio processing module, and wherein the set of representations comprises a first representation associated with the first audio processing module and a second representation associated with the second audio processing module.

11. The system of claim 10, wherein the instructions are executable by the one or more processors to configure the system to:
receive user input directed to the output node of the first representation and the input node of the second representation; and
after receiving the user input directed to the output node of the first representation and the input node of the second representation, display a visual connection between the output node of the first representation and the input node of the second representation.

12. The system of claim 1, wherein the audio processing workflow generation interface comprises a run workflow selectable element that, when selected, triggers generation of an output by running a workflow using the set of modules in accordance with visual connections displayed in the workflow canvas.

13. The system of claim 12, wherein the instructions are executable by the one or more processors to configure the system to, after generation of the output, generate and present a link to the output in the audio processing workflow generation interface.

14. The system of claim 12, wherein the instructions are executable by the one or more processors to configure the system to, after generation of the output, generate and present a playback feature in the audio processing workflow generation interface that enables playback of the output.

15. A method for facilitating audio processing, comprising:
causing presentation, on a user computing system, of an audio processing workflow generation interface, wherein the audio processing workflow generation interface comprises:
a module tray comprising a plurality of audio processing modules; and
a workflow canvas configured for placement and display of audio processing modules selected for inclusion in an audio processing workflow, wherein the workflow canvas comprises an input module and an output module, wherein the input module comprises a uniform resource identifier field for defining an audio signal workflow input;
receiving user input selecting a set of audio processing modules from the plurality of audio processing modules of the module tray, the set of audio processing modules comprising one or more audio processing modules;
receiving user input directed to the workflow canvas in association with the set of audio processing modules;
after receiving the user input directed to the workflow canvas in association with the set of audio processing modules, placing and displaying a set of representations of the set of audio processing modules on the workflow canvas, wherein each representation of the set of representations is associated with a respective audio processing module of the set of audio processing modules, and wherein each representation of the set of representations comprises an input node and an output node for the respective audio processing module;
receiving user input directed to an input module node of the input module and at least one input node of the set of representations, wherein the input module node is associated with the uniform resource identifier field, wherein the input module comprises an add input selectable element that, when selected, triggers addition of (i) an additional uniform resource identifier field for defining an additional audio signal workflow input and (ii) an additional input module node associated with the additional uniform resource identifier field;
after receiving the user input directed to the input module node and the at least one input node, displaying a visual connection between the input module node and the at least one input node within the workflow canvas;
receiving user input directed to at least one output node of the set of representations and an output module node of the output module; and
after receiving the user input directed to the at least one output node and the output module node, displaying a visual connection between the at least one output node and the output module node within the workflow canvas.

16. The method of claim 15, wherein the audio processing workflow generation interface comprises a run workflow selectable element, and wherein the method further comprises:
receiving user input selecting the run workflow selectable element; and
triggering generation of an output by running a workflow using the set of modules in accordance with visual connections displayed in the workflow canvas.

17. The method of claim 16, further comprising:
generating and presenting a link to the output in the audio processing workflow generation interface.

18. One or more computer-readable recording media that store instructions that are executable by one or more processors of a system to configure the system to:
cause presentation, on a user computing system, of an audio processing workflow generation interface, wherein the audio processing workflow generation interface comprises:
a module tray comprising a plurality of audio processing modules; and
a workflow canvas configured for placement and display of audio processing modules selected for inclusion in an audio processing workflow, wherein the workflow canvas comprises an input module and an output module, wherein the input module comprises a uniform resource identifier field for defining an audio signal workflow input;
receive user input selecting a set of audio processing modules from the plurality of audio processing modules of the module tray, the set of audio processing modules comprising one or more audio processing modules;

receive user input directed to the workflow canvas in association with the set of audio processing modules;

after receiving the user input directed to the workflow canvas in association with the set of audio processing modules, place and display a set of representations of the set of audio processing modules on the workflow canvas, wherein each representation of the set of representations is associated with a respective audio processing module of the set of audio processing modules, and wherein each representation of the set of representations comprises an input node and an output node for the respective audio processing module;

receive user input directed to an input module node of the input module and at least one input node of the set of representations, wherein the input module node is associated with the uniform resource identifier field, wherein the input module comprises an add input selectable element that, when selected, triggers addition of (i) an additional uniform resource identifier field for defining an additional audio signal workflow input and (ii) an additional input module node associated with the additional uniform resource identifier field;

after receiving the user input directed to the input module node and the at least one input node, display a visual connection between the input module node and the at least one input node within the workflow canvas;

receive user input directed to at least one output node of the set of representations and an output module node of the output module; and after receiving the user input directed to the at least one output node and the output module node, display a visual connection between the at least one output node and the output module node within the workflow canvas.

19. The one or more computer-readable recording media of claim 18, wherein the plurality of audio processing modules comprises one or more stem separation modules, one or more mixing modules, one or more mastering modules, one or more transcription modules, one or more generator modules, one or more effects modules, on or more utilities modules, one or more classification modules, one or more encoding modules, one or more enhancement modules, one or more style transfer modules, one or more data science modules, and one or more input/output modules.

20. The one or more computer-readable recording media of claim 18, wherein one or more representations of the set of representations comprise modifiable processing settings for the respective audio processing module(s).

* * * * *